US007031517B1

(12) United States Patent
Le et al.

(10) Patent No.: US 7,031,517 B1
(45) Date of Patent: Apr. 18, 2006

(54) METHOD AND APPARATUS FOR SEGMENTING IMAGES

(75) Inventors: Delphine Anh Dao Le, New South Wales (AU); Alison Joan Lennon, New South Wales (AU); Mathieu Hitter, Paris (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/410,737

(22) Filed: Oct. 1, 1999

(30) Foreign Application Priority Data

| Oct. 2, 1998 | (AU) | .................................... PP6341 |
| Oct. 2, 1998 | (AU) | .................................... PP6342 |
| Oct. 2, 1998 | (AU) | .................................... PP6343 |
| Oct. 2, 1998 | (AU) | .................................... PP6344 |

(51) Int. Cl.
*G06K 9/34* (2006.01)

(52) U.S. Cl. ..................................... 382/173
(58) Field of Classification Search ................ 382/101, 382/128, 173, 180, 224, 225, 204, 205, 240, 382/308
See application file for complete search history.

(56) References Cited

U.S. PATENT DOCUMENTS

| 5,572,258 A | 11/1996 | Yokoyama | .................. 348/415 |
| 5,734,736 A * | 3/1998 | Palmer et al. | .............. 382/103 |
| 5,748,761 A | 5/1998 | Chang et al. | ............... 382/107 |

OTHER PUBLICATIONS

Ikonomakis et al. "Region Growing and Region Merging Image Segmentation". IEEE Digital Signal Processing Proceedings, 1997. p 299-302, vol. 1.*

"Image Segementation and Approximation Through Surface Type Labelling and Region Merging". IEEE Electronics Letters, 198 p. 1380-1381, vol. 24, Iss. 22.*

"Spatio-Temporal Segmentation Of Video Data", by Wang, et al., Proceedings Of The SPIE, vol. 2182, Feb. 7, 1994, pp. 120-131.

"Video Coding By Segmenting Motion Vectors And Frame Differences", by Suk Byung Chae et al., Optical Engineering, vol. 32, No. 4, Apr. 1, 1994, pp. 120-131.

(Continued)

*Primary Examiner*—Jingge Wu
*Assistant Examiner*—Colin LaRose
(74) *Attorney, Agent, or Firm*—Fitzpatrick, Cella, Harper & Scinto

(57) ABSTRACT

The method discloses a method of segmenting an image. The method firstly (304) allocates pixels as seeds in areas of an image as a function of the luminance of the pixels and the size of those areas. The method then grows (306) regions from said seeds so as to segment the image into a number of regions. The method considers a number of pixels that border the growing regions and the pixel that is most similar in luminance to a region it borders is appended (528) to that region. The method then updates (528) the luminance of the appended region. The method continues until there are no more pixels bordering the growing regions. The method then encodes the segmented image (106). It does this by splitting (604) the image into a number of rectangular sub-images in a quadtree manner until each rectangular sub-image comprises a segmented image forming the dominant portion of the sub-image. The method then merges (606) rectangular sub-images which have a common dominant portion and share a common edge.

43 Claims, 15 Drawing Sheets

OTHER PUBLICATIONS

"Digital Image Processing", by Rafael C. Gonzalez, et al., Wesley Pub. Co. 1993, pp. 461-465.

"Seeded Region Growing", IEEE Trans. Pattern Anal. Machine Intell., vol. 16, 1994, pp. 641-647.

* cited by examiner

Splitting Initial State

Splitting Step 1

Splitting Step 2

Splitting Final State

Merging Final State

METHOD AND APPARATUS FOR SEGMENTING IMAGES

FIELD OF INVENTION

The present invention relates to the field of image segmentation. In particular, one aspect of the invention relates to the seeding of an image. Another aspect of the invention relates to segmenting images. A still further aspect of the invention relates to encoding an image having a number of segmented regions as a coded representation.

BACKGROUND OF INVENTION

Image segmentation is an initial step in many image processing tasks such as pattern recognition, image coding and image interpretation. For example, in scene understanding applications, the segmentation process generally provides a labelling process with regions to be classified.

The publication entitled "Digital Image Processing" by Rafael C. Gonzalez and Richard E. Woods, Addison-Wesley Publishing Company 1993 discloses on page 461–465, a method for image segmentation. This method utilizes a region splitting and merging procedure. This procedure subdivides an image initially into a set of arbitrary, disjointed regions and then merges and/or splits the regions depending whether the regions satisfy a certain homogeneity criteria. Typically, the homogeneity criterion is based on a threshold value arbitrarily selected by a user. However, this method suffers from the disadvantage that the choice of threshold values is critical for successful image segmentation. Specifically, a particular threshold value may work with one image but not necessarily with others. For example, this method often fails to split regions that must be separated or fails to merge regions that need not be separated. This is a consequence of the information about the uniformity in a region corresponding to an object surface and the discontinuity between regions corresponding to different object surfaces not being easily incorporated into the method.

The publication entitled "Seeded Region Growing" IEEE Trans. Pattern Anal Machine Intell., vol. 16 pp. 641–647, 1994 (hereinafter called Adams et al) discloses a method for segmentation of images. The Adams method is based on a region growing principle of selecting a pixel adjacent to a region of pixels, which is most similar to the region of pixels. The method does not rely on the arbitrary selection of homogeneity thresholds, but is controlled by choosing a small number of pixels, called seeds. This seed selection may be either automatic or manual. Once the seeds have been selected, the segmented regions are grown in an iterative fashion. Adams suggest using an automatic converging squares method for seeds selection. Adams uses this method to locate objects of minimum and maximum intensity in biomedical images. Each step of the Adam method involves the addition of one of the neighboring pixels to one of the regions grown from the seeds. A measure $\delta(x)$ is defined how different each of the neighboring pixels is from that region. The neighboring pixel having the minimum measure $\delta(x)$ is added to the region. Adams et al make use of a sorted list in determining the relevant neighboring pixel to be added. In Adams et al, once a pixel has been added to the list, the $\delta(x)$ measure is never updated. However, this method is not successful for images where the number of regions is large and the regions have diverse characteristics. Moreover, the Adams et al method suffers from the disadvantage of slow image segmentation. Whilst, this method is robust and easy-to-use, it also suffers from the disadvantage that the resultant segmented image is stored as a pixel-map representation and as such is memory consuming and not efficient for feature computation.

SUMMARY OF THE INVENTION

It is an object of the present invention to ameliorate one or more disadvantages of the prior art.

According to one aspect of the invention there is provided a method of seeding an image, the image comprising a plurality of pixels, wherein said method comprises the step of: distributing seeds in areas of said image as a function of a property of said pixels within those areas, wherein fewer seeds are allocated to those areas of the image having pixels homogeneous in said property.

According to another aspect of the invention there is provided a method of seeding an image having a plurality of pixels, the method comprising the steps of: dividing the image into one or more regions; allocating, for each region, one or more seeds as a function of the contrast of said pixels within the region and the size of the region as compared to the size of the image, wherein fewer seeds are allocated to those regions of the image having pixels of homogeneous contrast; and storing the pixel locations of each allocated seed.

According to still another aspect of the present invention there is provided a method of seeding an image comprising a plurality of pixels, wherein said method comprises the steps of: selecting the image or a previously divided area of the image as the current area; seeding the center of said current area when the contrast of the pixels and the size of current area meet a first predetermined condition; subdividing said current area when the contrast of the pixels and the size of current area meet a second predetermined condition; uniformly seeding said current area in a low density manner when the contrast of the pixels and the size of current area meet a third predetermined condition; subdividing said current area when contrast of the pixels and the size of current area meet a fourth predetermined condition; uniformly seeding said current area in a high density manner when the contrast of the pixels and the size of current area meet a fifth predetermined condition; and repeating the selecting and seeding steps until all of said divided areas are seeded, wherein fewer seeds are allocated to those areas of the image having homogeneous contrast.

According to still another aspect of the present invention there is provided a method of segmenting an image, the image comprising a plurality of pixels, wherein said method comprises the steps of: allocating one or more pixels as seeds; growing regions from said seeds so as to segment the image into a number of regions, wherein a number of pixels that border said growing regions are considered and that pixel of said number that is most similar in a property to a region it borders is appended to that region and the said property of the appended region is updated and said growing step is repeated until no pixels bordering the growing regions are available.

According to still another aspect of the present invention there is provided a method of segmenting an image, the image comprising a plurality of pixels, wherein said method comprises the steps of: allocating one or more pixels as seeds in the image; growing regions of pixels from said seeds, wherein said growing step comprises the sub-steps of: generating a list of pixels that border the growing regions; scanning a number of said pixels of the list; determining, for each said scanned pixel, a value indicative of the similarity of the luminance of said scanned pixel and the corresponding luminance of a growing region that said scanned pixel borders; selecting a pixel that has a minimum said value; appending said selected pixel to said growing region it borders; updating the said corresponding luminance of the appended region; repeating the sub-steps of the growing step until there are no more pixels that border the growing regions.

According to still another aspect of the present invention there is provided a method of encoding an image having a number of segmented regions, the method comprising the steps of: splitting said image into a plurality of rectangular areas, wherein each rectangular area comprises a said region or part thereof forming a dominant portion of the rectangular area; merging said rectangular areas which have a common said dominant portion and share a common edge; and outputting the vertices of the merged rectangular areas as a representation of the segmented image.

According to still another aspect of the present invention there is provided a method of segmenting an image, the image comprising a plurality of pixels and the method comprising the steps of: allocating one or more pixels as seeds; growing regions from said seeds so as to segment the image into a number of regions; storing the segmented image in a queue; performing the following sub-steps until said queue is empty; removing and selecting the segmented image or a previously divided rectangular area of said segmented image currently stored first in the queue as the current rectangular area; computing a value representative of the size of a dominant segmented region within said current area divided by the size of said current area; storing the co-ordinates of the current area, if said value is greater than a predetermined threshold, otherwise; dividing said current area into a plurality of rectangular areas and adding the said plurality of rectangular areas to the queue; merging said divided rectangular areas which have a common dominant region and share a common edge; and outputting the vertices of the merged rectangular areas as a representation of the segmented image.

According to still another aspect of the present invention there is provided a method of segmenting an image, the image comprising a plurality of pixels, wherein said method comprises the steps of: distributing seeds in areas of said image as a function of a property of said pixels within those areas, wherein fewer seeds are allocated to those areas of the image having pixels homogeneous in said property; and growing regions from said seeds so as to segment the image into a number of regions, wherein a number of pixels that border said growing regions are considered and that pixel of said number that is most similar in said property to a region it borders is appended to that region and the said property of the appended region is updated and said growing step is repeated until no pixels bordering the growing regions are available.

According to still another aspect of the present invention there is provided a method of segmenting an image, the image comprising a plurality of pixels, wherein said method comprises the steps of: (a) allocating pixels as seeds in areas of the image as a function of the luminance of the pixels within those areas, wherein fewer seeds are allocated to those areas of the image having pixels of homogeneous luminance and wherein said seeds form growing regions; (b) generating a list of pixels that border the growing regions; (c) scanning a number of said pixels of the list; (d) determining, for each said scanned pixel, a value indicative of the similarity of the luminance of said scanned pixel and the corresponding luminance of a growing region that said scanned pixel borders; (e) selecting a pixel that has a minimum said value; (f) appending said selected pixel to said growing region it borders; (g) updating the said corresponding luminace of the appended region; (h) repeating the sub-steps (b) to (g) until there are no more pixels that border the growing regions.

According to still another aspect of the present invention there is provided apparatus for seeding an image having a plurality of pixels, the apparatus comprising: means for dividing the image into one or more regions; means for allocating, for each region, one or more seeds as a function of the contrast of said pixels within the region and the size of the region as compared to the size of the image, wherein fewer seeds are allocated to those regions of the image having pixels of homogeneous contrast; and means for storing the pixel locations of each allocated seed.

According to still another aspect of the present invention there is provided apparatus for seeding an image comprising a plurality of pixels, wherein said apparatus comprises: means for selecting the image or a previously divided area of the image as the current area; means for seeding the center of said current area when the contrast of the pixels and the size of current area meet a first predetermined condition; means for subdividing said current area when the contrast of the pixels and the size of current area meet a second predetermined condition; means for uniformly seeding said current area in a low density manner when the contrast of the pixels and the size of current area meet a third predetermined condition; means for subdividing said current area when contrast of the pixels and the size of current area meet a fourth predetermined condition; means for uniformly seeding said current area in a high density manner when the contrast of the pixels and the size of current area meet a fifth predetermined condition; and means for repeating the operations of the selection and seeding means until all of said divided areas are seeded, wherein fewer seeds are allocated to those areas of the image having homogeneous contrast.

According to still another aspect of the present invention there is provided apparatus for segmenting an image, the image comprising a plurality of pixels, wherein said apparatus comprises: means for allocating one or more pixels as seeds; means for growing regions from said seeds so as to segment the image into a number of regions, wherein a number of pixels that border said growing regions are considered and that pixel of said number that is most similar in a property to a region it borders is appended to that region and the said property of the appended region is updated and said growing step is repeated until no pixels bordering the growing regions are available.

According to still another aspect of the present invention there is provided apparatus for segmenting an image, the image comprising a plurality of pixels, wherein said apparatus comprises: means for allocating one or more pixels as seeds in the image; means for growing regions of pixels from said seeds, wherein said growing means comprises: means for generating a list of pixels that border the growing regions, scanning a number of said pixels of the list; means for determining, for each said scanned pixel, a value indicative of the similarity of the luminance of said scanned pixel and the corresponding luminance of a growing region that said scanned pixel borders; means for selecting a pixel that has a minimum said value; means for appending said selected pixel to said growing region it borders; means for updating the said corresponding luminace of the appended region; and means for repeating the operations of the growing means until there are no more pixels that border the growing regions.

According to still another aspect of the present invention there is provided apparatus for encoding an image having a number of segmented regions, the apparatus comprising: means for splitting said image into a plurality of rectangular areas, wherein each rectangular area comprises a said region or part thereof forming a dominant portion of the rectangular area; means for merging said rectangular areas which have a common said dominant portion and share a common edge; and means for outputting the vertices of the merged rectangular areas as a representation of the segmented image.

According to still another aspect of the present invention there is provided apparatus for segmenting an image, the image comprising a plurality of pixels and the apparatus comprising; means for allocating one or more pixels as seeds; means for growing regions from said seeds so as to segment the image into a number of regions; means for storing the segmented image in a queue; means for removing and selecting, until said queue is empty, the segmented image or a previously divided rectangular area of said segmented image currently stored first in the queue as the current rectangular area; means for computing a value representative of the size of the dominant segmented region within said current area divided by the size of said current area; means for storing the co-ordinates of the current area, if said value is greater than a predetermined threshold; means for dividing said current area into a plurality of rectangular areas of said current area and adding the said plurality of rectangular areas to the queue, if said value is less than or equal to said predetermined threshold; means for merging said divided rectangular areas which have a common dominant region and share a common edge; and means for outputting the vertices of the merged rectangular areas as a representation of the segmented image.

According to still another aspect of the present invention there is apparatus for segmenting an image, the image comprising a plurality of pixels, wherein said apparatus comprises: means for distributing seeds in areas of said image as a function of a property of said pixels within those areas, wherein fewer seeds are allocated to those areas of the image having pixels homogeneous in said property; and means for growing regions from said seeds so as to segment the image into a number of regions, wherein a number of pixels that border said growing regions are considered and that pixel of said number that is most similar in said property to a region it borders is appended to that region and the said property of the appended region is updated and said growing step is repeated until no pixels bordering the growing regions are available.

According to still another aspect of the present invention there is provided apparatus for segmenting an image, the image comprising a plurality of pixels, wherein said apparatus comprises: means for allocating pixels as seeds in areas of the image as a function of the luminance of the pixels within those areas, wherein fewer seeds are allocated to those areas of the image having pixels of homogeneous luminance and wherein said seeds form growing regions; means for generating a list of pixels that border the growing regions; means for scanning a number of said pixels of the list; means for determining, for each said scanned pixel, a value indicative of the similarity of the luminance of said scanned pixel and the corresponding luminance of a growing region that said scanned pixel borders; means for selecting a pixel that has a minimum said value; means for appending said selected pixel to said growing region it borders; means for updating the said corresponding luminace of the appended region; and means for repeating the operations of the allocating means, generating means, scanning means, determining means, appending means, and updating means until there are no more pixels that border the growing regions.

According to still another aspect of the present invention there is provided a computer program product, including a computer readable medium having recorded thereon a computer program for seeding an image, the image comprising a plurality of pixels, wherein said computer program product comprises: means for distributing seeds in areas of said image as a function of a property of said pixels within those areas, wherein fewer seeds are allocated to those areas of the image having pixels homogeneous in said property.

According to still another aspect of the present invention there is provided a computer program product, including a computer readable medium having recorded thereon a computer program for seeding an image having a plurality of pixels, the computer program product comprising: means for dividing the image into one or more regions; means for allocating, for each region, one or more seeds as a function of the contrast of said pixels within the region and the size of the region as compared to the size of the image, wherein fewer seeds are allocated to those regions of the image having pixels of homogeneous contrast; and means for storing the pixel locations of each allocated seed.

According to still another aspect of the present invention there is provided a computer program product, including a computer readable medium having recorded thereon a computer program for seeding an image comprising a plurality of pixels, wherein said computer program product comprises: means for selecting the image or a previously divided area of the image as the current area; means for seeding the center of said current area when the contrast of the pixels and the size of current area meet a first predetermined condition; means for subdividing said current area when the contrast of the pixels and the size of current area meet a second predetermined condition; means for uniformly seeding said current area in a low density manner when the contrast of the pixels and the size of current area meet a third predetermined condition; means for subdividing said current area when contrast of the pixels and the size of current area meet a fourth predetermined condition; means for uniformly seeding said current area in a high density manner when the contrast of the pixels and the size of current area meet a fifth predetermined condition; and means for repeating the operations of the selection and seeding means until all of said divided areas are seeded, wherein fewer seeds are allocated to those areas of the image having homogeneous contrast.

According to still another aspect of the present invention there is provided a computer program product, including a computer readable medium having recorded thereon a computer program for segmenting an image, the image comprising a plurality of pixels, wherein said computer program product comprises: means for allocating one or more pixels as seeds; and means for growing regions from said seeds so as to segment the image into a number of regions, wherein a number of pixels that border said growing regions are considered and that pixel of said number that is most similar in a property to a region it borders is appended to that region and the said property of the appended region is updated and said growing step is repeated until no pixels bordering the growing regions are available.

According to still another aspect of the present invention there is provided a computer program product, including a computer readable medium having recorded thereon a computer program for segmenting an image, the image comprising a plurality of pixels, wherein said computer program product comprises: means for allocating one or more pixels as seeds in the image; means for growing regions of pixels from said seeds, wherein said growing means comprises: means for generating a list of pixels that border the growing regions; scanning a number of said pixels of the list; means for determining, for each said scanned pixel, a value indicative of the similarity of the luminance of said scanned pixel and the corresponding luminance of a growing region that said scanned pixel borders; means for selecting a pixel that has a minimum said value; means for appending said selected pixel to said growing region it borders; means for updating the said corresponding luminace of the appended region; and means for repeating the operations of the growing means until there are no more pixels that border the growing regions.

According to still another aspect of the present invention there is provided a computer program product, including a computer readable medium having recorded thereon a computer program for encoding an image having a number of segmented regions, the computer program product comprising: means for splitting said image into a plurality of rectangular areas, wherein each rectangular area comprises a said region or part thereof forming a dominant portion of the rectangular area; means for merging said rectangular areas which have a common said dominant portion and share a common edge; and means for outputting the vertices of the merged rectangular areas as a representation of the segmented image.

According to still another aspect of the present invention there is provided a computer program product, including a computer readable medium having recorded thereon a computer program for segmenting an image, the image comprising a plurality of pixels and the computer program product comprising: means for allocating one or more pixels as seeds; means for growing regions from said seeds so as to segment the image into a number of regions; means for storing the segmented image in a queue, means for removing and selecting, until said queue is empty, the segmented image or a previously divided rectangular area of said segmented image currently stored first in the queue as the current rectangular area, means for computing a value representative of the size of the dominant segmented region within said current area divided by the size of said current area; means for storing the co-ordinates of the current area, if said value is greater than a predetermined threshold; means for dividing said current area into a plurality of rectangular areas of said current area and adding the said plurality of rectangular areas to the queue, if said value is less than or equal to said predetermined threshold; means for merging said divided rectangular areas which have a common dominant region and share a common edge; and means for outputting the vertices of the merged rectangular areas as a representation of the segmented image.

According to still another aspect of the present invention there is provided a computer program product, including a computer readable medium having recorded thereon a computer program for segmenting an image, the image comprising a plurality of pixels, wherein said computer program product comprises: means for distributing seeds in areas of said image as a function of a property of said pixels within those areas, wherein fewer seeds are allocated to those areas of the image having pixels homogeneous in said property; and means for growing regions from said seeds so as to segment the image into a number of regions, wherein a number of pixels that border said growing regions are considered and that pixel of said number that is most similar in said property to a region it borders is appended to that region and the said property of the appended region is updated and said growing step is repeated until no pixels bordering the growing regions are available.

According to still another aspect of the present invention there is provided a computer program product, including a computer readable medium having recorded thereon a computer program for segmenting an image, the image comprising a plurality of pixels, wherein said computer program product comprises: means for allocating pixels as seeds in areas of the image as a function of the luminance of the pixels within those areas, wherein fewer seeds are allocated to those areas of the image having pixels of homogeneous luminance and wherein said seeds form growing regions; means for generating a list of pixels that border the growing regions; means for scanning a number of said pixels of the list; means for determining, for each said scanned pixel, a value indicative of the similarity of the luminance of said scanned pixel and the corresponding luminance of a growing region that said scanned pixel borders; means for selecting a pixel that has a minimum said value; means for appending said selected pixel to said growing region it borders; means for updating the said corresponding luminace of the appended region; and means for repeating the operations of the allocating means, generating means, scanning means, determining means, appending means, and updating means until there are no more pixels that border the growing regions.

BRIEF DESCRIPTION OF THE DRAWINGS

Embodiments of the invention are described with reference to the drawings, in which.

DETAILED DESCRIPTION

Figure 1:
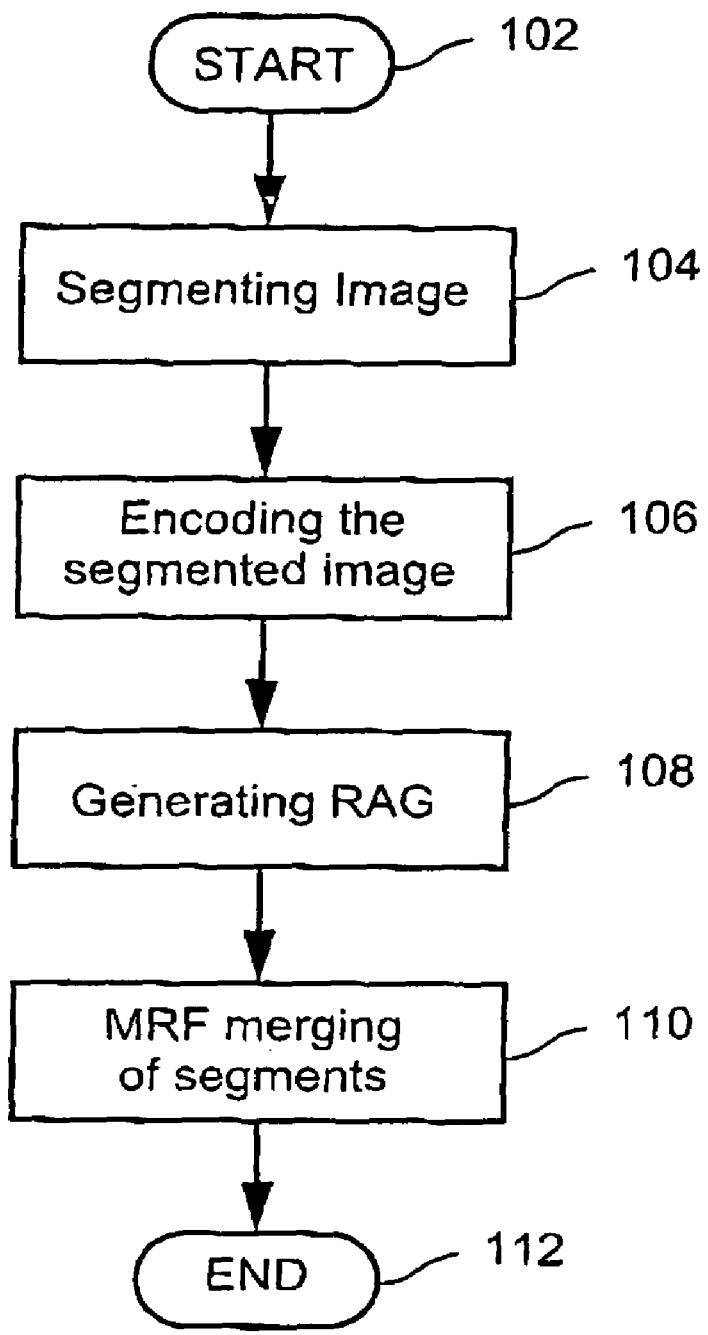
FIG. 1 is a flow chart of a method of segmenting an image in accordance with a preferred embodiment.

Where reference is made in any one or more of the accompanying drawings to steps and/or features, which have the same reference numerals, those steps and/or features have for the purposes of this description the same function(s) and/or operation(s), unless the contrary intention appears.

The principles of the preferred method have general applicability to the segmentation of multiple colored or black and white images. The method has been described with reference to a number of specific examples of images and it is not intended that the invention be limited to such specific examples.

1.0 Overview of Preferred Method

FIG. 1 is a flow diagram of a method of segmenting an image in accordance with a preferred embodiment of the invention. The method commences at step 102, where image data is inputted and any necessary parameters are initialized. The image data is a pixel-map representation of an original image. The pixel-map includes a numerical representation of the particular color for each pixel location in a rectangular array. Any numerical representation of color can be used and can be expressed as a sequence of one or more numbers. Preferably, the image data is inputted on a pixel by pixel basis in raster image order, i.e. from left to right across a display device and from top to bottom of the display device in a non-interlaced fashion. Pixel locations at the pixel grid are represented by an array of row (i) and column (j) specifications. Also, other information may be inputted at this stage, such as header information. Such header information can include the size of the image, i.e. array size (i×j).

In the next step 104, the inputted image is initially segmented into a number of regions. In this first stage, over-segmentation is preferred rather than under-segmentation. Regions, which should not have been separated, can be merged later during the MRF merging step 110. Whereas regions, which should have been separated, cannot be separated later during the MRF merging step 110. The initial segmentation step 104 is not only fast but also accurate and produces a limited number of regions; i.e. the over splitting is moderate. The initial segmented image is outputted as a pixel-map representation. The preferred initial segmentation process is described in more detail in the section herein entitled "1.1 Process of Initial Segmentation". After step 104, the processing continues at step 106.

In step 106, the initial segmented image is converted to a coded representation. This coded representation needs less memory and provides faster access for feature computation (See Table 1) than the pixel-map of the initial segmented image. The preferred embodiment stores the coded segmented image as a list of rectangles or squares instead of the pixel-map representation. The preferred conversion method is described in more detail in the section herein entitled "1.2 Process of Encoding Initial Segmented Image".

After step 106, the processing continues at step 108. In this step 108, the coded initial segmented image is represented as a region adjacency graph (RAG). The initial RAG is constructed from the initial segmentation result. Given an image that is segmented into a set of N disjoint regions such that R={$R_i$, $1 \leq i \leq N$}, the RAG is constructed by denoting each region $R_i$ as a node and connecting the regions which share a common boundary. Thus, a neighborhood system is defined on the graph, so that only spatially adjacent regions are neighbors. A clique is a subset of R such that it contains either a single node or several nodes that are all neighbors of each other, and where C is the set of all the cliques.

Figure 2A:
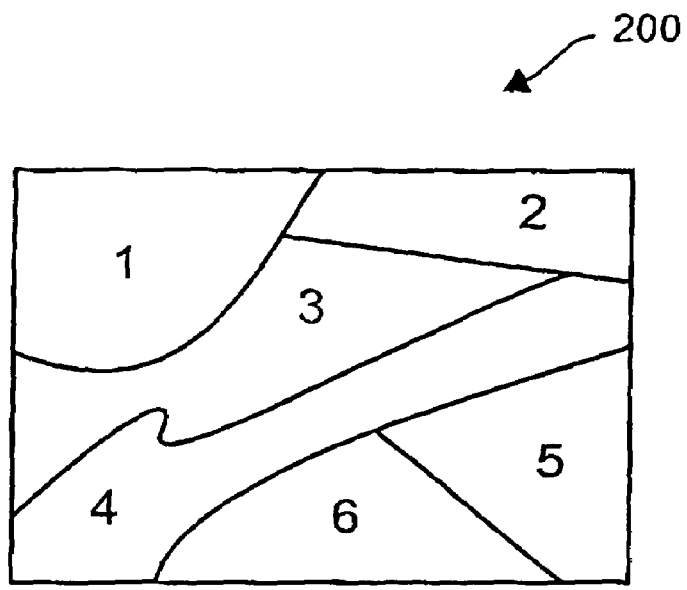
FIGS. 2A & 2B are is illustrated an example of a segmented image and a corresponding region adjacency graph.
Figure 2B:
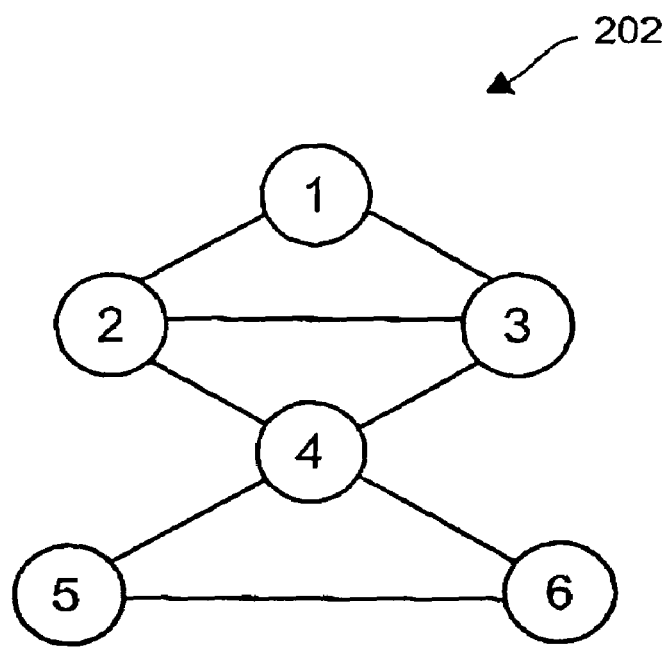

Turning now to, FIGS. 2A and 2B there is illustrated an example of a segmented image 200 and a corresponding region adjacency graph 202. The segmented regions 1, 2, 3, 4, 5 and 6 of the image 200 are denoted as respective nodes 1, 2, 3, 4, 5 and 6 on the region adjacency graph 202. As can be seen, the couplings between the nodes on the graph 202 represent the common boundaries between the regions.

Returning to FIG. 1, the method continues at step 110 where a Markov Random Field (MRF) merging process is commenced. The RAG and coded initial segmented image are inputted to this step 110. This step 110 merges the segmented images in a systematic approach, wherein the number of segmented regions are reduced by taking into account region uniformity of such features as intensity, color texture etc. Discontinuities can also be taken into account by introducing a boundary process. The output of this merging process is a final segmented image. The preferred MRF merging process is described in more detail in the section herein entitled "1.3 Markov Random Field (MRF) Merging Process".

The processing of the image segmentation terminates at step 112, where the final segmented image is outputted.

1.1 Initial Segmentation Process

Figure 3:
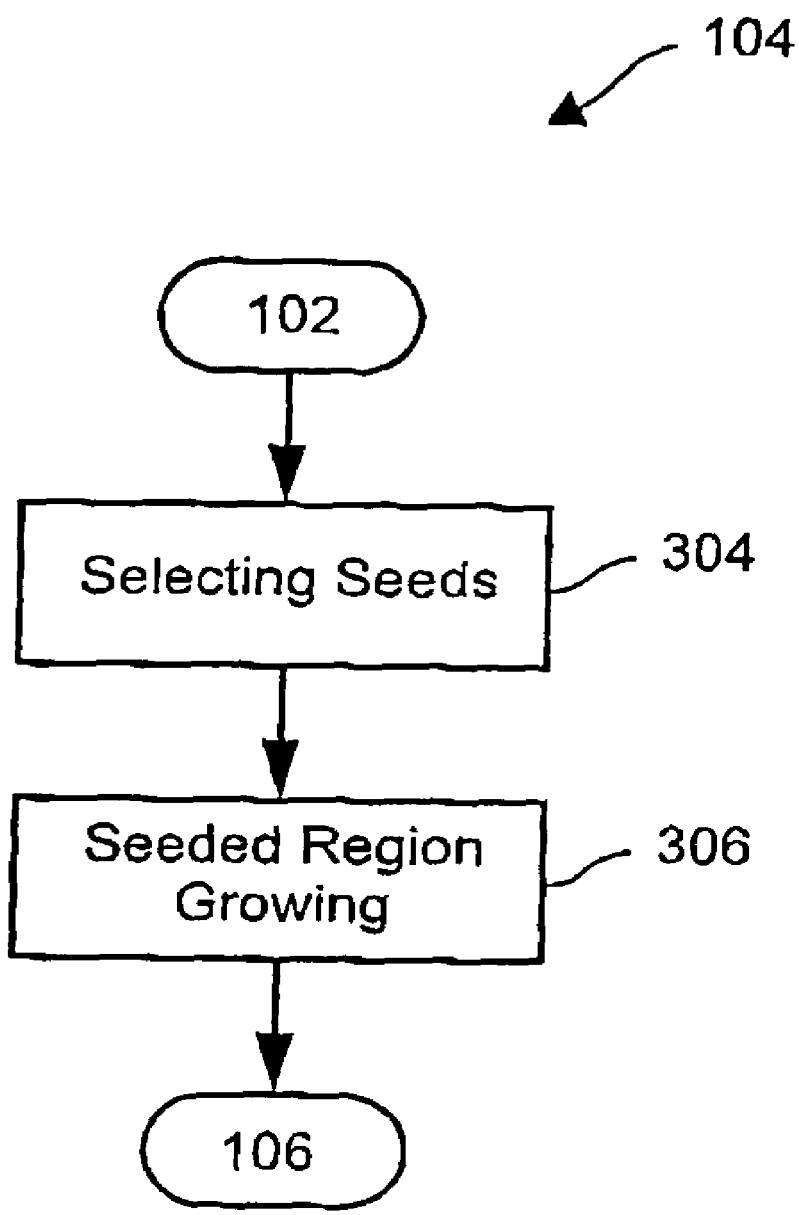
FIG. 3 is a flow chart of a method of segmenting an image as used in FIG. 1.

FIG. 3 is a flow chart of a method of initially segmenting an image as used in step 104 of FIG. 1. The method commences at step 102, where the image data is inputted. As mentioned above, the image data is a pixel-map representation of an original image. In the next step 304, a list of pixels is generated which are to be used as seeds for region growing. The automatic selection of an appropriate set of pixels or set of small connected regions, called seeds controls the method of initially segmenting the image. The selection of the set of seeds or small regions is critical for the success of the image segmentation. This can be done by using a quad-tree approach in order to distribute seeds according to a homogeneity criterion based on the contrast of the pixels. The preferred process for generating these seeds is described in more detail in the next section, herein entitled "1.1.0 Processor for Selecting Seeds".

In the next step 306, the process takes the generated seeds and grows seeded regions in an iterative fashion. At each iteration, all those pixels of the image that border the growing regions are considered. The pixel that is most similar to a region that it borders is appended to that region. Alternatively, the similarity of a limited number of these pixels may be considered at each iteration, thus speeding up the processing. The preferred process for growing the seeded regions is described in more detail in the section herein entitled "1.1.1 Process for Growing Seeded Regions". This process continues until all pixels have been allocated to an associated region, resulting in a segmented image. The output of the seeded region growing is a set of homogeneous regions, wherein the number of regions obtained is equal to the number of seeds. During this step, the regions will continue to grow until they are bounded on all sides by other growing/grown regions. Also, some regions will grow more at the expense of others. For instance, there will tend to be large regions in the homogeneous areas and small regions in the non-homogeneous areas. Furthermore, the contrast for each region is re-evaluated while the region grows. In this way, the preferred method is able to segment the image. After completion of this step 306, the processing terminates and returns to step 106.

1.1.0 Process for Selecting Seeds

The seed selection process 304 is a simple and fast quad-tree approach, which distributes the seeds over the image, but it allocates fewer seeds in homogeneous areas of the image. The seed selection process address color data by preferably processing the luminance image, i.e. a grey-scale image. The homogeneity is measured by a simple contrast criterion: the difference between the minimum and maximum luminance.

The following pseudocode is illustrative of the method of seeding an image for use in FIG. 3.

Pseudocode SEED

| | |
|---|---|
| RECTANGLE | A rectangle, given by (x,y) and (width,height) |
| RECTANGLE_LIST | FIFO list of rectangles |
| SEED_LIST | List of pixels (seeds) |
| CONTRAST | Difference between min and max luminance |
| HI_MIN_SIZE | Maximum block size for contrast assessment |
| LO_MIN_SIZE | Minimum block size for block splitting (<HI_MIN_SIZE) |
| HI_DENSITY, LO_DENSITY | Densities for pixel spreading |
| HI_THRESHOLD, LO_THRESHOLD | Contrast thresholds |

Figure 4A:
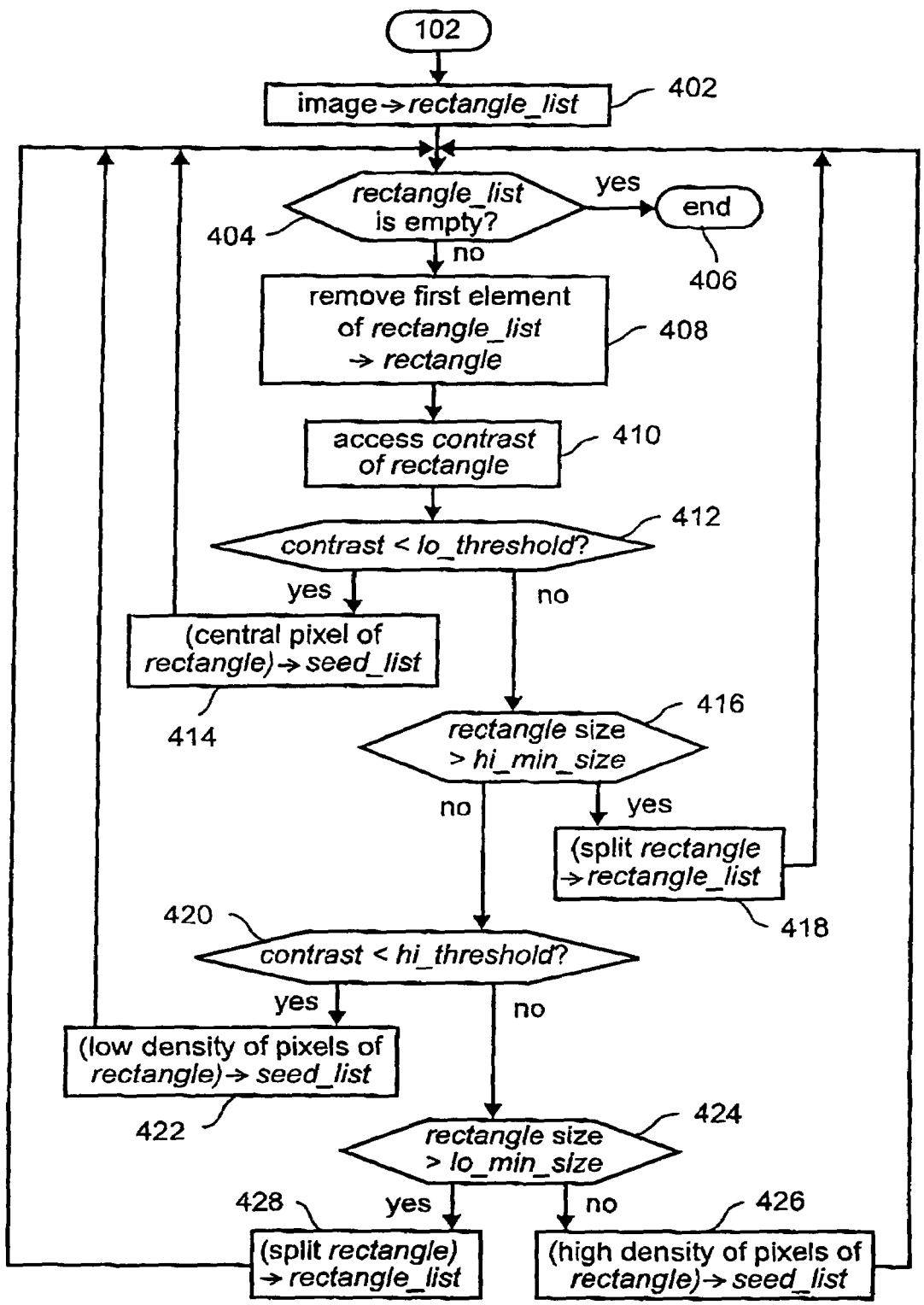
FIG. 4A is a flow chart of a method of seeding an image as used in FIG. 3.

Initialize RECTANGLE_LIST with the rectangle corresponding to the whole image.
while RECTANGLE_LIST is not empty
  remove first element from RECTANGLE_LIST and keep it in RECTANGLE;
  assess CONTRAST for area of the image corresponding to RECTANGLE;
  if CONTRAST < LO_THRESHOLD
    add the pixel corresponding to the center of RECTANGLE to SEED_LIST;
    continue loop;
  if RECTANGLE size > HI_MIN_SIZE
    split RECTANGLE into four and add the new rectangles in RECTANGLE_LIST;
    continue loop;
  if CONTRAST < HI_THRESHOLD
    spread pixels over RECTANGLE with LO_DENSITY;
    add them to SEED_LIST;
    continue loop;
  if RECTANGLE size > LO_MIN_SIZE
    split RECTANGLE into four and add the new rectangles in RECTANGLE_LIST;
    continue loop;
  spread pixels over RECTANGLE with HI_DENSITY;
  add them to SEED_LIST;
endwhile Turning now to FIG. 4, there is shown a flow chart of the last mentioned pseudocode called SEED. The seed selection processing commences at step 402, where rectangle co-ordinates corresponding to the entire image are stored in a FIFO buffer called RECTANGLE_LIST. After step 402, the processing continues at decision block 404, where a check is made whether the RECTANGLE_LIST is empty. If the decision block returns true then processing is terminated at step 406. Otherwise, the processing continues at step 408, where the first element in RECTANGLE_LIST is removed and stored in the variable rectangle.

In the next step 410, the contrast of the entire image or a sub-image thereof corresponding to the removed rectangle is determined. The contrast is determined by calculating the difference between the minimum and maximum luminance values of the pixels in the rectangle. After step 410, the processing continues at decision block 412, where a check is made whether the determined contrast is less than a predetermined low threshold value called LO_THRESHOLD. If the decision block 412 returns true, then the co-ordinates of central pixel of the rectangle are added to a list called seed_list. In this way, sub-images corresponding to the rectangle which have a low contrast and which are of any size have a center as a seed (see Table A). If the decision block 412 returns false, the processing continues at decision block 416. In decision block 416, a check is made whether the size of the rectangle is greater than a predetermined constant called HI_MIN_SIZE. If the decision block 416 returns true, then the processing continues at step 418. In step 418, the rectangle is divided into four sub-rectangles in the manner of a quadtree approach. In this way, sub-images corresponding to rectangles of a large size having medium and high contrast are split (see Table A). After step 418, the processing continues at step 404, where the four sub-rectangles are added to the FIFO buffer RECTANGLE_LIST. If however, the decision block 416 returns false, the processing continues at decision block 420.

In the decision block 420, a check is made whether the determined contrast is less than a predetermined high threshold value called HI_THRESHOLD. If the decision block 420 returns true, then processing continues at step 422, where a number of pixels from the rectangle are added to the SEED_LIST as seeds. These newly added seed pixels are evenly distributed throughout the current rectangle in such a manner that there is a low density of such seed pixels in the rectangle. In this way, a low density seeding is achieved for sub-images of a small and medium size (See Table A). After step 422, the processing continues at step 404. If, however, the decision block 420 returns false then the processing continues at decision block 424.

In the decision block 424, a check is made whether the size of the rectangle is greater than a predetermined minimum size called LO_MIN_SIZE. If the decision block returns false, the processing continues at step 426, where a number of pixels from the rectangle are added to the SEED_LIST as seeds. These newly added seed pixels are evenly distributed throughout the current rectangle in such a manner that there is a high density of such seed pixels in the rectangle. In this way, a high density seeding is achieved for sub-images of a small size (See Table A). If, however, the decision block 424 returns true then the processing continues at step 428. In step 428, the rectangle is divided into four sub-rectangles in the manner of a quadtree approach. In this way, corresponding sub-images of a medium size and high contrast are split (see Table A).

TABLE A

Allocation of seeds as a function of:
(1) the contrast of current sub-image, and
(2) the size of the rectangle corresponding to the current sub-image as compared to the size of the rectangle corresponding to the entire image

| | Small size | Medium size | Large size |
|---|---|---|---|
| Low contrast | Center of rectangle is a seed | Center of rectangle is a seed | Center of rectangle is a seed |
| Med contrast | Low density seeding | Low density seeding | Split rectangle |
| High contrast | High density seeding | Split rectangle | Split rectangle |

Turning now to Table A, it can be seen that the split rectangular regions of the image of any size whose pixels have small variance in luminance (low contrast) are seeded in their center. In addition, split rectangular regions of a small or medium size whose pixels have a medium variance in luminance (medium contrast) are seeded evenly throughout these regions in a low density manner. Furthermore, rectangular regions of a small size whose pixels have a high variance in luminance (high contrast) are seeded evenly throughout the region in a high density manner. On the other hand, rectangular regions of medium size and high contrast are split into four rectangular sub-regions. In addition, rectangular regions of a large size and of a medium or high contrast are also split into rectangular sub-regions. This splitting continues in a quadtree manner until the split sub-region(s) meets the abovementioned relevant size and contrast requirements for seeding. As will be apparent, these rectangular sub-images can be in some circumstances equilateral rectangular sub-images.

Figure 4B:
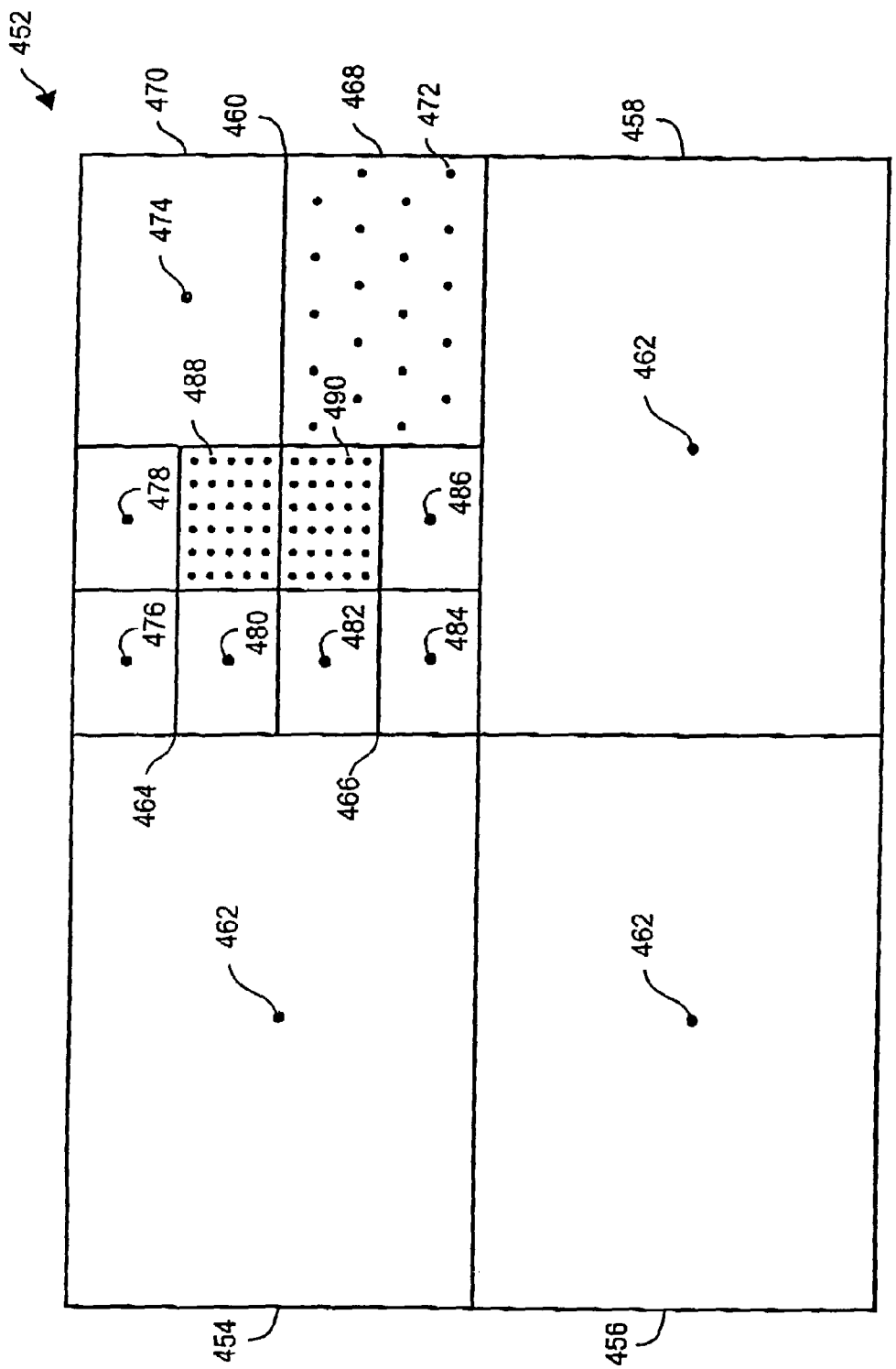
FIG. 4B, illustrates an example of a seeded image seeded according to FIG. 4A.

Turning now to FIG. 4B, there is a shown an example of a seeded image 452 seeded according to the preferred process 306. For simplicity's sake, the image itself is not shown. Initially, during the seeding process, the original image is inputted and its contrast is determined. As the original image in this example has a medium contrast and is of a large size (as compared to itself), the image is split into four rectangles 454, 456, 458, and 460. The process then considers each of the these rectangles 454, 456, 458, and 460. As the images, in this example, within rectangles 454, 456, and 458 are of low contrast, and of a large size as compared to the original image, the centers of these rectangles are taken as seeds 462. However, as the image, in rectangle 460 is of a high contrast and large size, the rectangle is split further into four sub-rectangles 464, 466, 468, and 470. The process then considers each sub-rectangle 464, 466, 468, and 470. As rectangle 464 and 466 are both of a high contrast and medium size they are each further split into four sub-rectangles. As rectangle 468 is of a medium contrast and size, the rectangle is allocated seeds 472 in a low density manner. In addition, as rectangle 470 is of a low contrast and medium size, the center of this rectangle is taken as a seed 474. The seeding processing continues in a similar manner, until all split rectangles have been seeded. In this particular example, the split rectangles are center seeded 476, 478, 480, 482, 484, and 486 and the remaining split rectangles are allocated seeds 488, and 490 in a high density manner. At the completion of the seeding process, a list of all the pixel locations of seeds 462, 472, 474, 476, 478, 480, 482, 484, 486, 488, and 490 is established.

The preferred seeding process is a simple and fast approach which distributes the seeds over the entire image, while allocating fewer seeds in homogeneous areas of the image. Furthermore, there is a high probability at least one seed will be allocated to each homogeneous region of the image.

1.1.1 Process for Growing Seeded Regions

The seeded region growing process 306 takes a set of seeds, individual pixels or small groups of connected pixels, generated by step 304, as input. The preferred process 306 grows the seed regions in an iterative fashion. At each iteration, all those pixels that border the growing regions are considered. The pixel, which is most similar to a region that it borders, is appended to that region. In the preferred process, all the regions can be grown simultaneously.

The process evolves inductively from the seeds, namely, the initial state of the sets or regions $A_1, A_2, \ldots, A_n$. Each step of the iterative process involves the addition of one pixel to one of the above sets. We now consider the state of the sets $(A_i)$ after m steps. Let T be the set of all as-yet unallocated pixels which border at least one of the regions, $$T = \left\{ x \notin \bigcup_{i=1}^{n} A_i \,\middle|\, N(x) \cap \bigcup_{i=1}^{n} A_i \neq 0 \right\}, \qquad \text{Eqn (1)}$$

where N(x) is the set of immediate neighbors of the pixel x. For each candidate pixel x, an index i(x) is found, which correspond to the adjacent region where x is most likely to be included and a criterion δ(x) is computed; δ(x) measures how good a candidate x is for region $A_i$.

If, for x∈T we have that N(x) meets just one of the $A_1$, then we define $i(x) \in \{1, 2, \ldots, n\}$ to be that index such that $N(x) \cap A_{i(x)} \neq 0$ and define δ(x) to be a measure of how different x is from the region it adjoins. The simplest definition for δ(x) is $$\delta(x) = \left| g(x) - \operatorname*{mean}_{y \in A_{i(x)}}[g(y)] \right|, \qquad \text{Eqn (2)}$$

where g(x) is the grey value of the image point x adjoining region $A_1(x)$ and g(y) is the grey value of the image point y within region $A_i(x)$. The extension of this criterion to color images requires the choice of a suitable metric in color space. For example, the absolute value of the Euclidean distance between the color of pixel x and the mean color of region $A_i(x)$ could be used. Alternatively, the segmentation could be performed on the luminance image as per on gray-scale images.

If N(x) meets two or more of the $A_1$, we take i(x) to be a value of i such that N(x) meets $A_i$ and δ(x) is minimized.

Then, a candidate pixel $z \in T$ is chosen such that $$\delta(z) = \min_{x \in T}\{\delta(x)\}. \qquad \text{Eqn (3)}$$

and append z to $A_{i(z)}$.

This completes step m+1. The process is repeated until all pixels have been allocated. The process commences with each $A_i$ being just one of the seeds. The equations 2 and 3 ensure that the final segmentation is into regions as homogeneous as possible given the connectivity constraint.

In the preferred process 306, δ(x) is updated only for a limited number of the candidate pixels at each step of the iteration. Consequently, as the color of the limited number of candidate pixels is always compared with the updated mean color of the neighboring regions, the quality of the segmentation is comparable with Adams et al. Furthermore, as the process does not consider all the candidate pixels, especially when the list is relatively long, the speed of the region growing process can be significantly increased without reducing the quality of the final segmentation. The region growing process 306 uses two ways, either alone or in combination, to avoid scanning the whole candidate pixels list.

The first one is to use a variable step when scanning the candidate pixel list, the value of the step depending on the size of the candidate list: the longer the list, the bigger the step. Another advantage of this method is a better control on the processing time (if there is a linear relation between the size of the candidate list and the step).

The second process consists in skipping a whole part of the list by choosing the first candidate pixel x such that δ(x) is smaller than δ(z), z being the pixel selected at the previous step. If such a pixel is found, then the scanning of the list is interrupted prematurely; otherwise, the whole list is scanned to find the candidate pixel with the minimum δ(x) value, and the threshold is tuned to that value.

As successive best candidates often belong to the same region, inserting the new candidates (neighbors of the selected pixel) at the beginning of the list can reduce the computation time. However, they are not considered at the first step after their insertion in order not to introduce a bias in favor of a particular region.

The following pseudocode is illustrative of the preferred method of seeding an image for use in FIG. 3.

```
Pseudo-code REGION GROWING
SEED_LIST         List of seeds (pixels)
CANDIDATE_LIST    List of pixels which are neighboring at least one
                  region
REGION [ ]        Array used to store the growing regions i.e.
                  the lists of classified pixels
MEAN [ ]          Array containing the mean gray value or
                  luminance color of the regions
DELTA             Function measuring the difference between
                  a pixel and a neighboring region
MIN               Variable used for storing the minimum DELTA
CHOSEN_PIX        Chosen pixel
CHOSEN_REG        Index of the chosen region
DYN_THRESHOLD     Dynamic threshold to allow early selection
                  of a candidate pixel
DYN_STEP          Dynamic step for the scan loop
                  of CANDIDATE_LIST
DYN_START         Dynamic starting position for the scan loop
Initialize each REGION with the corresponding seed of
SEED_LIST and initialize
CANDIDATE_LIST with the neighbors of each seed;
DYN_THRESHOLD = 0;
DYN_START = 0;
while CANDIDATE_LIST is not empty
  Set DYN_STEP depending the size of CANDIDATE_LIST,
  e.g. DYN_STEP = size of CANDIDATE_LIST / 300
    for i = DYN_START to size of CANDIDATE_LIST i =
    i+DYN_STEP
      CURRENT_PIX = pixel i in CANDIDATE_LIST
      if (DELTA(CURRENT_PIX) < MIN)
        MIN = DELTA(CURRENT_PIX)
        CHOSEN_PIX = PROCES_PIX
        CHOSEN_REG = index of the chosen region
      stop for if MIN < DYN_THRESHOLD
    endfor
    put each unclassified neighbor of CHOSEN_PIX in
    CANDIDATE_LIST and set
    DYN_START as the number of new pixels in CANDIDATE_LIST;
    Put CHOSEN_PIX in REGION[CHOSEN_REG];
    Update MEAN[CHOSEN_REG];
    Remove CHOSEN_PIX from CANDIDATE_LIST;
    DYN_THRESHOLD = max (DYN_THRESHOLD, MIN)
endwhile
```

Figure 5A:
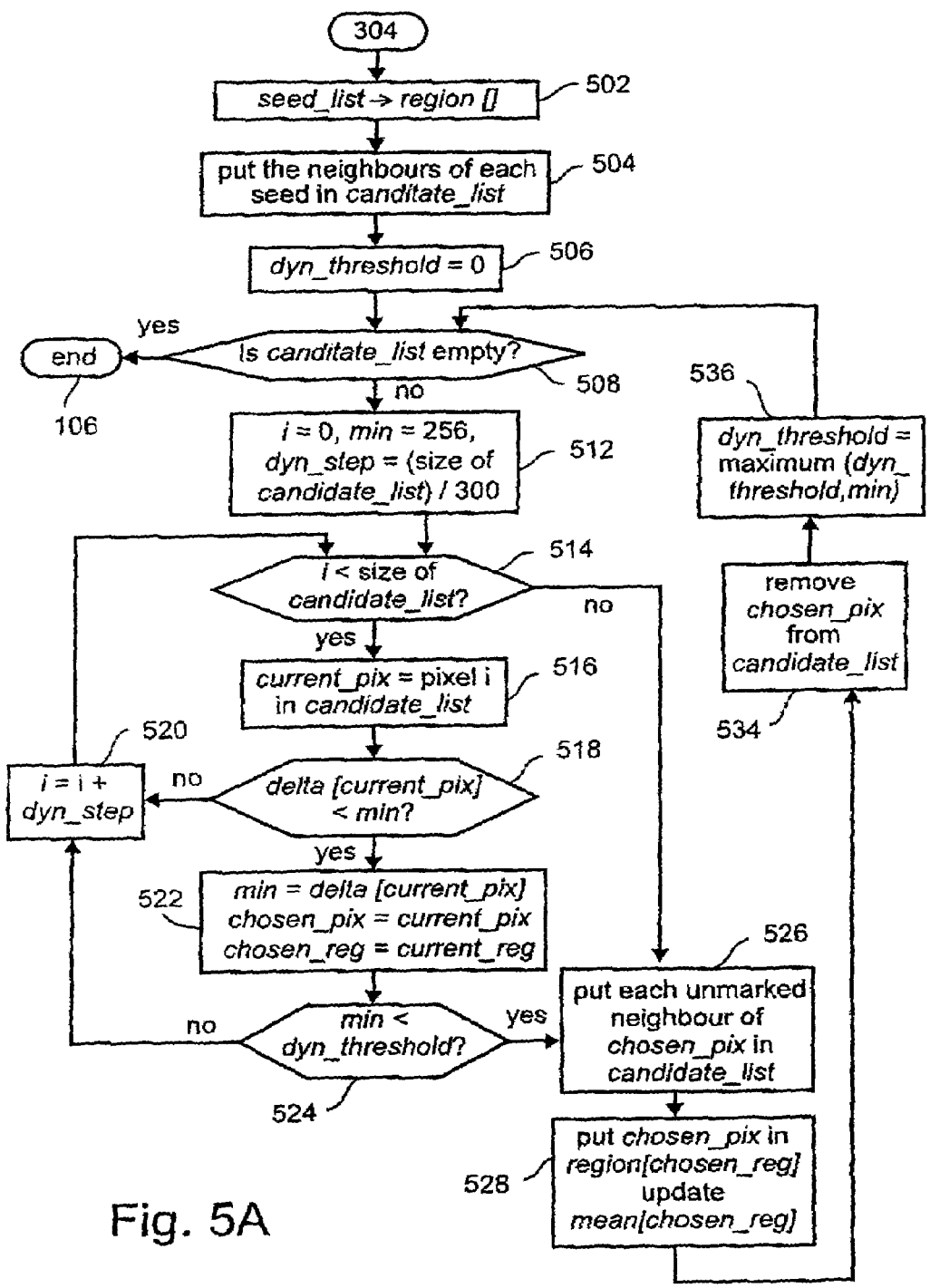
FIG. 5A is a flow chart of a method of seeded region growing as used in FIG. 3.

Turning now to FIG. 5A, there is shown a flow chart of the last mentioned pseudocode named REGION GROWING for growing the segmented regions. The processing commences at step 502, where the seed list is stored in an array called REGION[ ]. This array REGION[ ] is used to store the growing regions, i.e. the lists of classified pixels. Initially, the seeds of the image are denoted as the initial regions for growing.

In the next step 504, the neighboring pixels of each seed are determined and stored in a list called CANDIDATE_LIST. In the next step 506, a variable DYN_THRESHOLD is set to zero. This variable stores a dynamic threshold to allow early selection of a candidate pixel in a manner, which will be explained below. After step 506 the processing continues at decision box 508, in which a check is made whether the CANDIDATE_LIST is empty. The CANDIDATE_LIST will be empty once there are no more pixels neighboring the growing regions. If the decision box 508 returns true then the processing continues at step 510 where the region growing process 306 is completed. If the decision block 508 returns false then the processing continues at step 512.

In step 512 the variable loop counter i is set to zero, the variable MIN is set to 256, and the variable DYN_STEP is set to the current size of the CANDIDATE_LIST divided by 300. The variable MIN is used for storing the minimum delta value of the previous iteration of the loop 508-512, . . . , and 536. The variable DYN_STEP is used for storing a variable step value used for scanning the CANDIDATE-LIST. This variable step value is used for determining the delta values for a limited number of candidates in the CANDIDATE-LIST. Specifically, only those candidates spaced apart by a value equal to the step value will be considered for allocation to the region. After step 512, the processing continues at decision box 514, where a check is made whether the loop counter is less than the size of the CANDIDATE_LIST.

If the decision block 514 returns false, the processing continues at step 526, which is described below. If, however, the decision box 514 returns true then the region growing process has not considered all the limited number of neighboring pixels. In this situation the processing continues at step 516, where the variable CURRENT_PIX is set to pixel i in the CANDIDATE_LIST. This step 516 sets the next candidate pixel to be considered. It should be noted that this pixel is spaced apart from the previous pixel considered by a distance equal to the value stored in the variable DYN_STEP. After step 516, the processing continues at the decision box 518.

In decision box 518, a comparison is made whether the difference between the luminance value of the current candidate pixel and the mean of the neighboring region is less than MIN. If the decision box 518 returns false, then the processing continues at step 520. In step 520 the loop counter i is incremented by the step value stored in DYN_STEP. If the decision box 518, returns true, then the processing continues at step 522. In step 522, the MIN variable is now set to the minimum delta value determined for the current pixel. In addition, the variable CHOSEN_PIX is set to the selected current pixel and the variable CHOSEN_REG is set to the index of the current region. After step 522, the processing continues at step 524.

In decision block 524, a comparison is made whether the current minimum delta value stored in MIN is less than the current value stored in DYN_THRESHOLD. If the decision block 524 returns false then the processing continues at step 520, where the loop counter i is incremented by the step value stored in DYN_STEP. Otherwise, if the decision block 524 returns true then the processing continues at step 526. In step 526, each pixel neighboring the current pixel stored in CHOSEN_PIX, and not previously stored in the CANDIDATE_LIST, is now added to the CANDIDATE_LIST. During step 528, the contrast of the region is updated and stored in REGION[CHOSEN_REG]. After step 528, the processing continues at step 530, where the current pixel stored in CHOSEN_PIX is added to the region which is stored in REGION[CHOSEN_REG]. At the next step 534, the current pixel stored in CHOSEN_PIX is removed from the candidates in CANDIDATE_LIST. The processing then continues at step 5636, where the variable is reset to the maximum value of the current values stored in MIN and DYN_THRESHOLD. After which, the processing returns to decision block 508. The process terminates when the CANDIDATE_LIST is empty.

The preferred growing process of FIG. 5A continues until all pixels have been allocated to an associated region, resulting in a segmented image. The output of the seeded region growing is a set of homogeneous regions, wherein the number of regions obtained is equal to the number of seeds. The regions will continue to grow until they are bounded on all sides by other growing/grown regions. Also, some regions will grow more at the expense of others. For instance, there will tend to be large regions in the homogeneous areas and small regions in the non-homogeneous areas. Furthermore, the contrast for each region is re-evaluated while the region grows. In this way, the preferred method is able to segment the image.

Figure 5B:
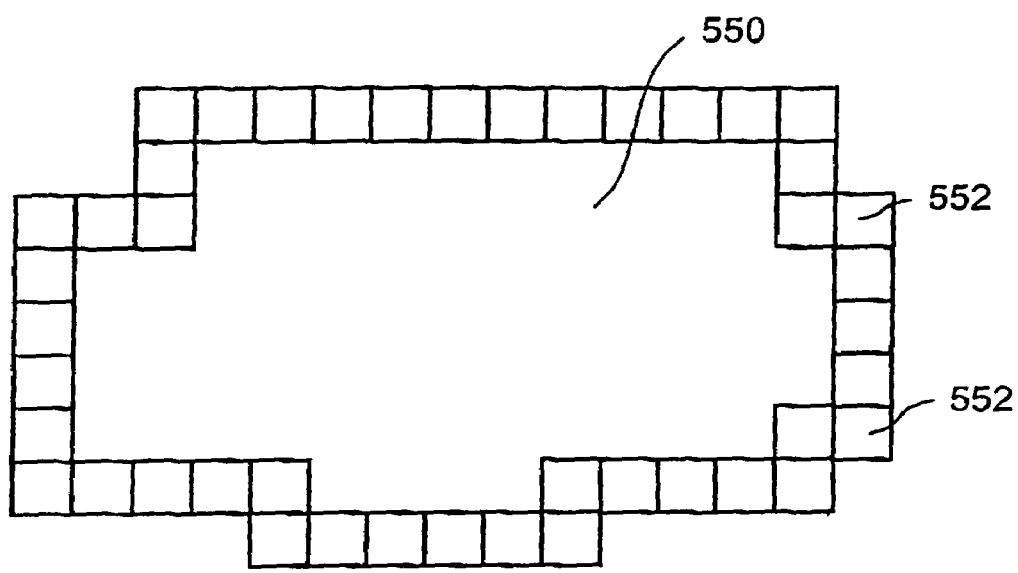
FIG. 5B illustrates a simplified example of the preferred region growing process of FIG. 5A.

FIG. 5B illustrates a simplified example of the preferred region growing process. For simplicities sake, this example shows only one region of the region growing process, whereas the preferred method allows the simultaneous growing of multiple regions. An initial region 550 consisting of a plurality of pixels (not shown) is surrounded by a number of candidate pixels 552 to be added to the region 550. Firstly, the process calculates the mean of the luminance values of the pixels of the region 550. Then the process determines the difference between this mean and the luminance value of a limited number of candidate pixels 552 in turn. The process then determines the minimum difference of these differences and allocates the candidate pixel associated with this minimum difference to the region 550. If however, the luminance difference value of any candidate pixel is less than the minimum difference value in the previous iteration, then the process instead allocates this candidate pixel to the region 550 and then proceeds to the next iteration. In the next iteration, the mean value of the luminance values of the pixels of the grown region 550 is then recalculated and the process continues.

1.2 Process of Encoding Segmented Image

Figure 6:
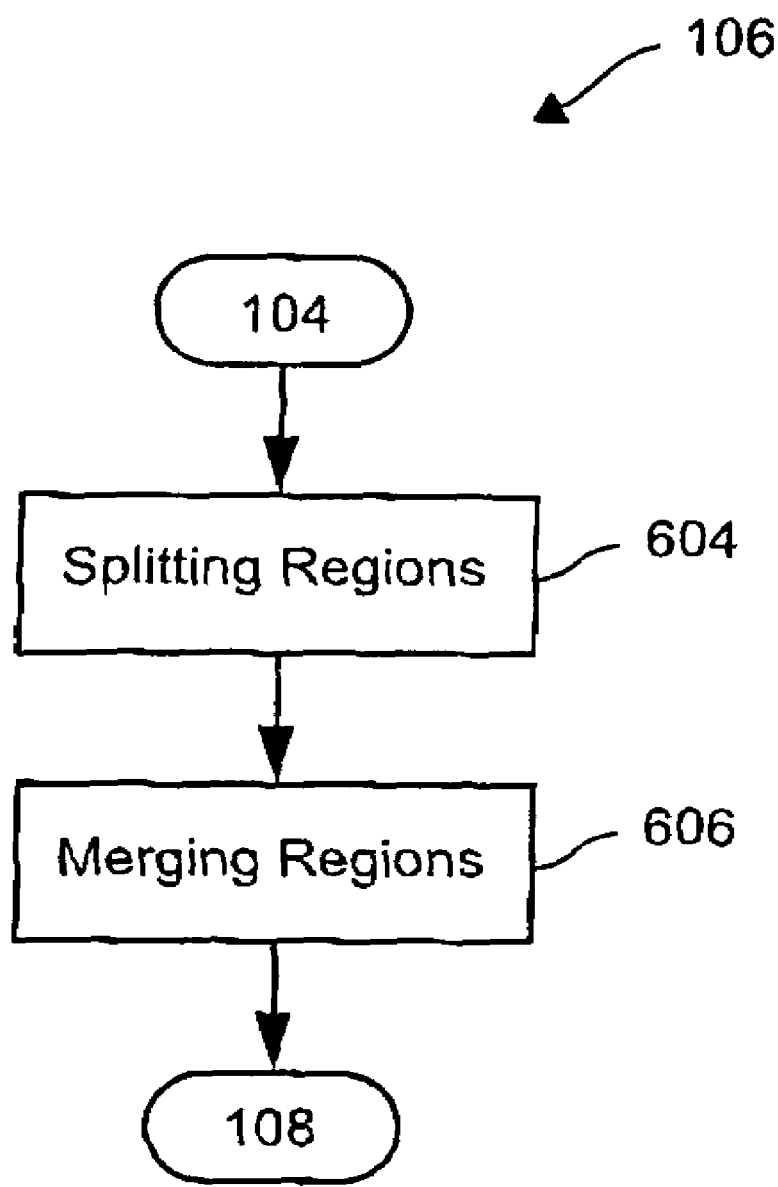
FIG. 6 is a flow chart of a method of coding a segmented image as used in FIG. 1.

FIG. 6 is a flow diagram of the method 106 of encoding the segmented image utilized in FIG. 1. The input data to the method 106 is a pixel-map representation of the image which has previously been segmented into regions in step 104, each region being defined as a set of connected pixels. In the method 106 a different name is assigned to each segmented region, which can be done arbitrarily. The method 106 comprises two consecutive steps: splitting 604 each region's shape into non-overlapping rectangular blocks; and merging 606 rectangular blocks which belong to the same region in order to limit their number. The step 606 outputs to step 108 a coded representation of the segmented image. The regions of the segmented image are defined as a list of distinct rectangles. Specifically, each region of any arbitrary shape, is partitioned into a set of non-overlapping blocks which cover its entire area. The preferred method 106 limits the number of blocks used for each region. The coded representation is outputted in the form of a set co-ordinates of the vertices of the rectangles together with their associated color information. In this way, the storage requirements for the segmented image are minimized. Moreover, since it is faster to iterate through a list of blocks than through a list of pixels, the access to the pixels of the region for feature computation is faster. The preferred process 604 for splitting the segmented image is described in more detail in the section herein entitled "1.2.1 Process of Splitting the Segmented Image". The preferred process 606 for merging the split regions is described in more detail in the section herein entitled "1.2.2 Process for Merging the Split Regions".

1.2.1 Process of Splitting the Segmented Image

The splitting step is based on a quad-tree splitting approach. The input image, i.e. the initial block, is divided into 4 rectangular subblocks and each block is recursively split into 4 subblocks until the blocks are included (or mostly included) in a region or reach a minimum size. This implies finding all the regions which are represented in each block and the area of overlapping between the block and those regions. This search can be limited by using the following scheme.

Beforehand, all the region names are stored in a list. The initial list of all the names is associated with the initial block. Then a reduced list of names will be associated with each block, which consists of the names of the regions which can be found in the block; those names are the names of the regions which were previously found in the parent block. Thus, the search of the regions which are present in a given block is not too long.

The following pseudo-code is illustrative of the process 604 of splitting the segmented image into regions as used in FIG. 6.

pseudocode SPLIT

Variables

MIN_SIZE CONSTANT: Minimum size for rectangles (e.g. minimum height and width).

DELTA CONSTANT: If more than DELTA percent of a rectangle is covered by a single region, then the rectangle is considered to be included in the region (DELTA is a percentage between 0.5 and 1).

NO_REGIONS Constant: Number of regions in the image.

RECT A rectangle.

NAME_LIST A list of region names.

RECT_QUEUE FIFO queue containing rectangles to be processed.

NAME_QUEUE FIFO queue containing the lists of possible region names for each rectangle (i.e. the names of the regions which can be found in the rectangle) in RECT_QUEUE.

REGION[ ] OUTPUT: An array of lists of rectangles, of length NO_REGIONS. Each list of rectangles corresponds to the rectangles which are included in a specific region of the image.

(The regions are ordered arbitrarily.)

Procedure

Initialise RECT_QUEUE with the rectangle corresponding to the whole image and NAME_QUEUE with the list of all the region names.

```
while (RECT_QUEUE is not empty)
    remove first element from RECT_QUEUE and keep it in RECT
    remove first element from NAME_QUEUE and keep it in
        NAME_LIST
    if (RECT is bigger than MIN_SIZE)
        if (there is a region of NAME_LIST which takes part in, at least,
            DELTA of RECT)
            add RECT to REGION[index of that dominant region's name]
        else split RECT, add the four new rectangles into RECT_QUEUE,
            and add the new name list - made of the name of the regions which
            actually were in RECT - in NAME_QUEUE.
    else find the dominant region in RECT and add RECT to REGION
    [index of the region's name]
```

Figure 7A:
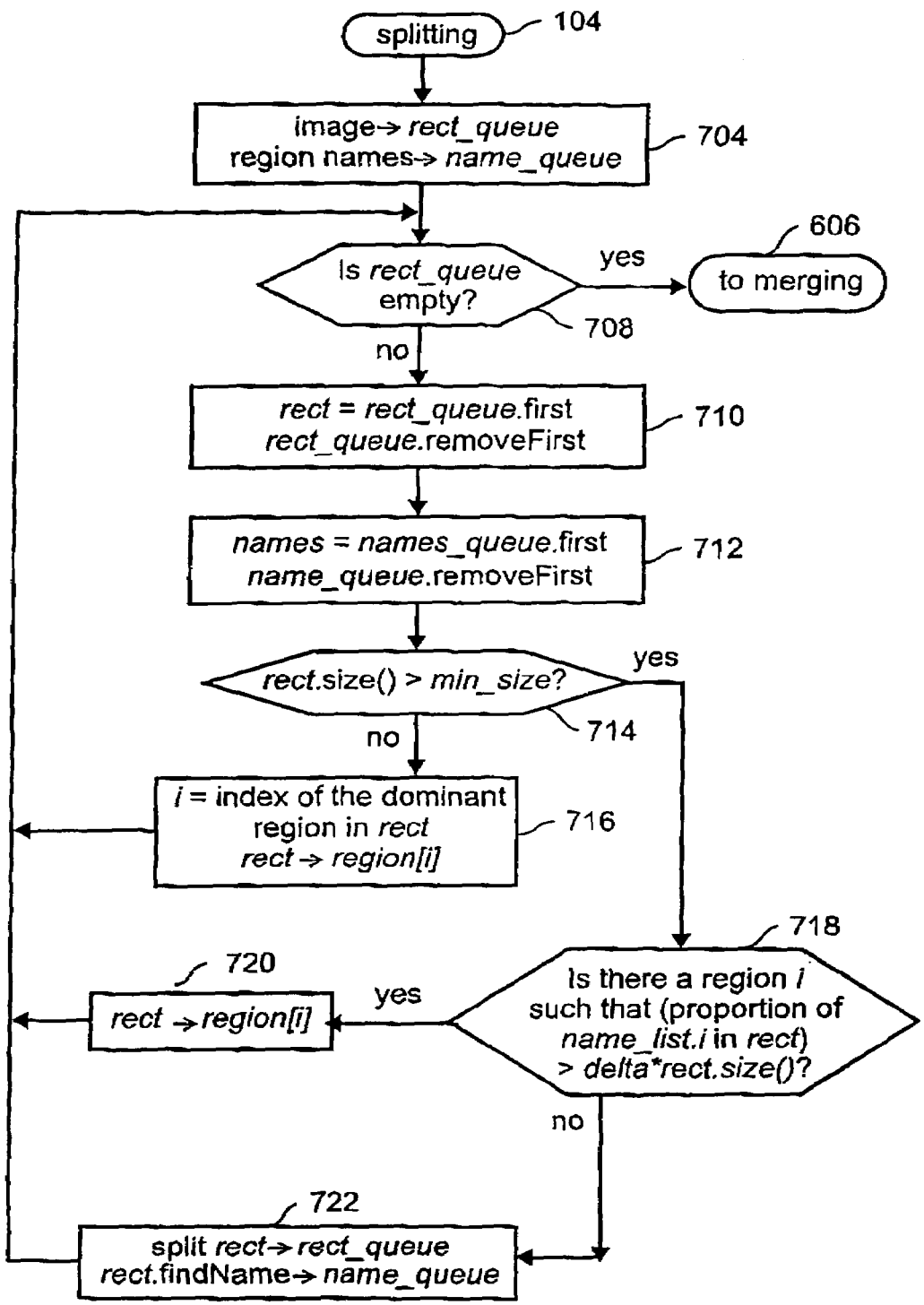
FIG. 7A is a flow chart of splitting a segmented image as used in FIG. 6.
Figure 7B:
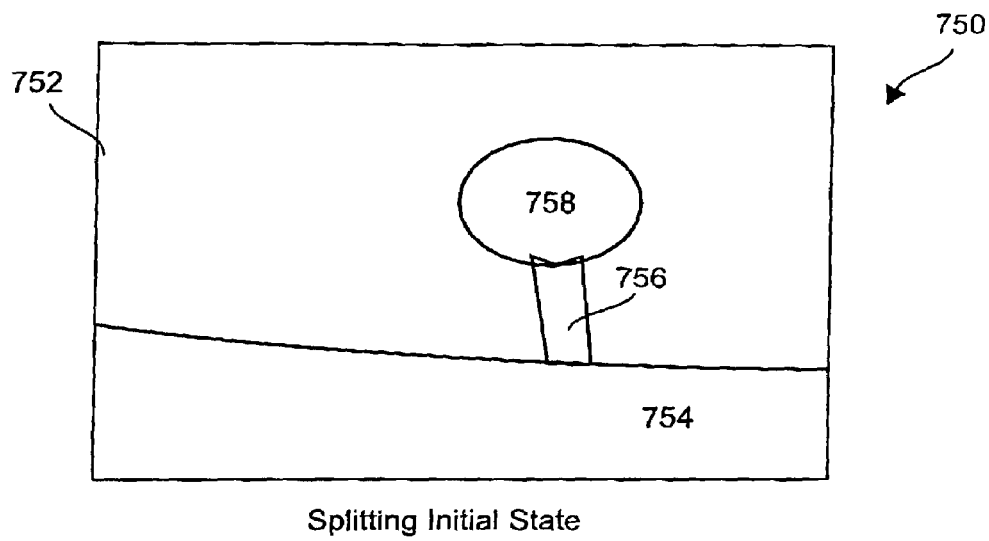
FIGS. 7B to 7E illustrates an example of splitting a segmented image in accordance with the preferred splitting process of FIG. 7A.
Figure 7C:
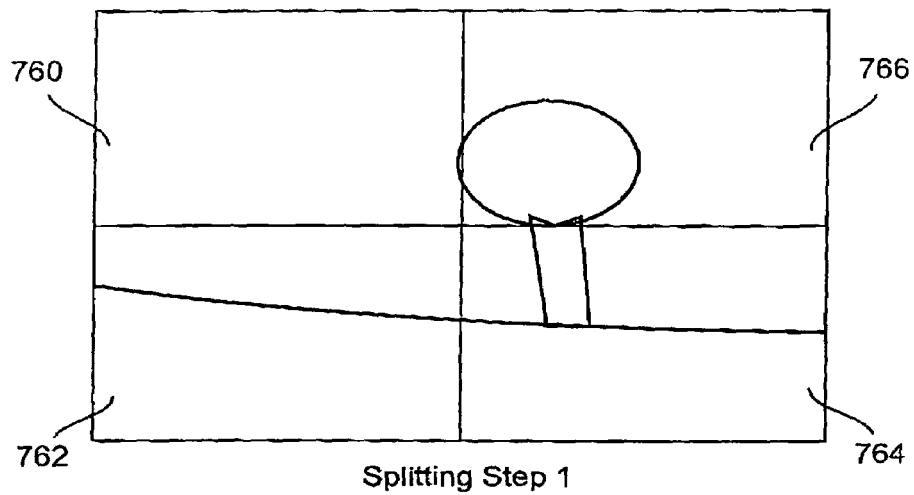
Figure 7D:
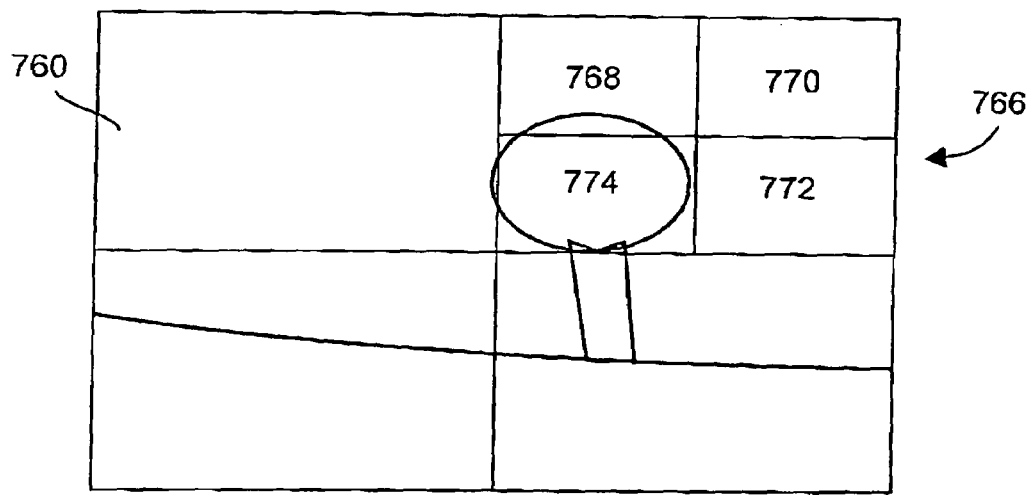

Turning now to FIG. 7A, there is shown a flow chart of the last mentioned pseudo code called SPLIT for splitting the segmented image. The processing commences at step 104. In the next step 704, the entire image is stored in a FIFO queue called RECT-queue for processing. In addition, the names of the regions which can be found in the current rectangle are stored in a FIFO queue called NAME_QUEUE. After step 706, the processing continues at decision box 708.

In decision box 708, a check is made whether the FIFO queue called RECT_QUEUE is empty. If the decision box returns true, then the processing continues at step 710 where the splitting process terminates and continues with the merging process 606. If the decision box 708 returns false, the processing continues at step 710. In step 710 a variable called RECT is set to the first rectangle, in the RECT_QUEUE. Subsequently this rectangle is then removed from the queue called RECT_QUEUE. In the next step 712 the first name in the NAME_QUEUE is retrieved and stored in the NAME_LIST. The name is then deleted from the NAME_QUEUE. Afterwards the processing continues at decision box 714.

In decision box 714, a check is made whether the size of the rectangle is greater than a minimum size MIN-SIZE. If the decision box 714, returns false then the processing continues to step 716. In step 716, the dominant region within the rectangle is determined and this rectangle is added to a list of rectangles and indexed by the dominant regions name. The dominant region is preferably the largest region within the rectangle. After step 716, the processing returns to decision box 708.

If the decision box 714 returns true, then the processing continues at decision box 718. In decision box 718 a check is made whether there exists a region REGION[i] on the NAME_LIST whose intersection with the rectangle is greater than the value DELTA times the size of the rectangle. It is in this way, the process determines the dominant segmented region within the rectangle. If the decision box 718, returns true then the processing continues at step 720. In step 720, the rectangle is added to the list of rectangles REGION[ ]. The rectangle is added to the REGION[i] array at that location in the array corresponding to the index of dominant regions name. After step 720 the processing returns to decision block 708.

If the decision box 718 returns false, then the processing continues at step 722. In step 722, the rectangle is split into four sub-rectangles. These four sub-rectangles are then added to the FIFO queue RECT_QUEUE and the names of the regions which were in the previous rectangle are added to the FIFO queue NAME_QUEUE. After step 722 the processing returns to decision block 708.

FIGS. 7B to 7E illustrate an example of the splitting process 604 used in FIG. 6. Initially a segmented image 750 is inputted. The segmented image is in the form a pixel map representation having a number of segmented regions 752, 754, 756, and 758 having the same associated color data. In the first step, the whole segmented image is input as the current rectangle. Next a check is made whether the dominant segmented region, that is the largest segmented region in the current rectangle, is greater than 95% the current rectangle's size. In the present example, this check reveals that the segmented regions 752, 754, 756 and 758 are less than 95% the size of the whole image. In the next step the process divides the segmented image into four rectangles 760, 762, 764, and 766. The process again makes the same check commencing on rectangle 760. In the present example, the check reveals the dominant region 752 is greater than 95% of the current rectangle size and the vertices of this rectangle are stored against this dominant region 752. The same check is made against rectangle 766, which reveals no dominant region and as such the rectangular is further split into four sub-rectangles 768, 770, 772, and 774. This processing continues until all of split sub-rectangles are allocated to one of the segmented regions 752, 754, 756, and 758 of FIG. 7E. In the event, the splitting continues below a predetermined size MIN_SIZE, the most dominant segmented region in this case is allocated the rectangle. Preferably, MIN_SIZE is greater than a 1×1 pixel block, but not too large either. After the processing is completed, the segmented regions 752, 754, 756, and 758 are each represented by vertices of a series of rectangles.

1.2.2 Process for Merging the Split Regions

The second step 606 of the encoding process 106 consists in merging adjacent rectangles in each region in order to minimise the number of rectangles representing a region. Two rectangles are considered adjacent if they share a common edge; thus, their reunion is still a rectangle.

The rectangle lists are still stored in the array REGION[ ] which comes from the splitting step 604. Adjacent rectangles to a specific rectangle are found by scanning the rectangle list and picking the first adjacent rectangle found. The pseudocode for performing the preferred merging is shown below.

```
for (i = 0 to i = NO_REGIONS – 1)
    count = 0
    while (count < number of rectangles in REGION[i])
        if (there is an adjacent rectangle of rectangle count, in region i)
        merge both rectangles, add the result in REGION[i] and remove
    them from the list
        else count++
```

Figure 8A:
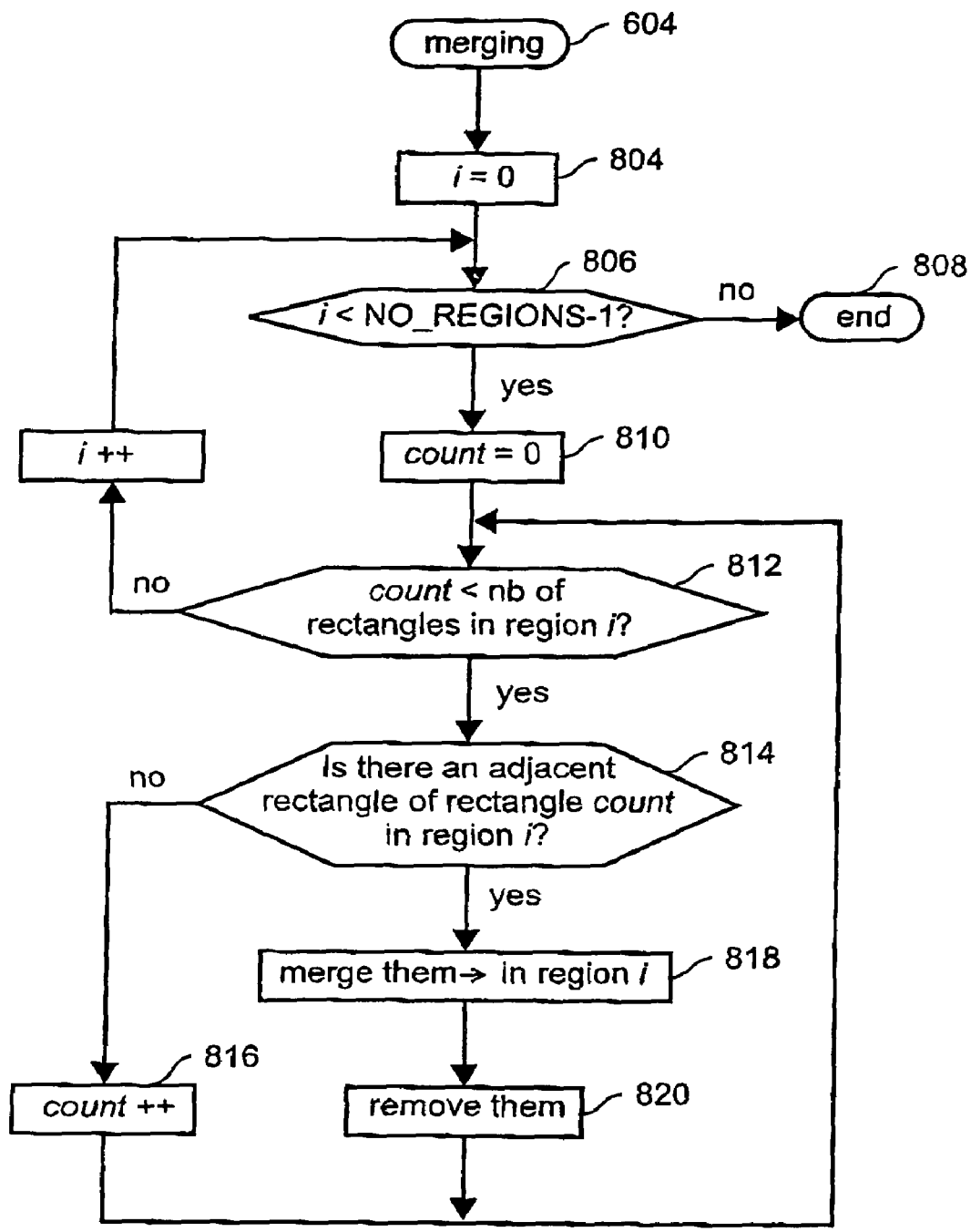
FIG. 8A is a flow chart of merging a segmented image as used in FIG. 7.

Turning now to FIG. 8A, there is shown a flowchart of the last mentioned pseudo code for merging the rectangles. After the splitting step 604, the processing commences at step 804, where a loop counter called i is set to zero. After which processing continues at the decision box 806. In the decision box 806 a check is made whether the loop counter i is less than the constant NO_REGIONS-1. If the decision box 806 returns false, the processing terminates at step 808.

If the decision box 806 returns true then the processing continues at step 810 where the variable called COUNT is set to zero, after which the processing continues at decision box 812. In decision box 812, a check is made whether the variable count is less than the number of rectangles in REGION[i]. If the decision box 812 returns false then the processing continues at step 814 where the loop counter i is incremented by one and the processing is returned to decision box 806.

The decision box 812 returns true then the processing continues at the decision box 814. In decision box 814, a check is made whether there exists an rectangle adjacent to the rectangle COUNT in REGION[i]. If the decision box 814 returns false then the processing continues at step 816 where the variable COUNT is incremented by one. After step 816 the processing is returned to decision box 812.

If the decision box 814 returns true then the processing continues at step 818. In step 818 both the adjacent rectangles are merged together and the result is listed in the REGION[i] at the end of the list. In addition, both the rectangles are removed from the list of rectangles stored in REGION[i] in step 820. After step 820, the processing returns to decision box 812.

Figure 7E:
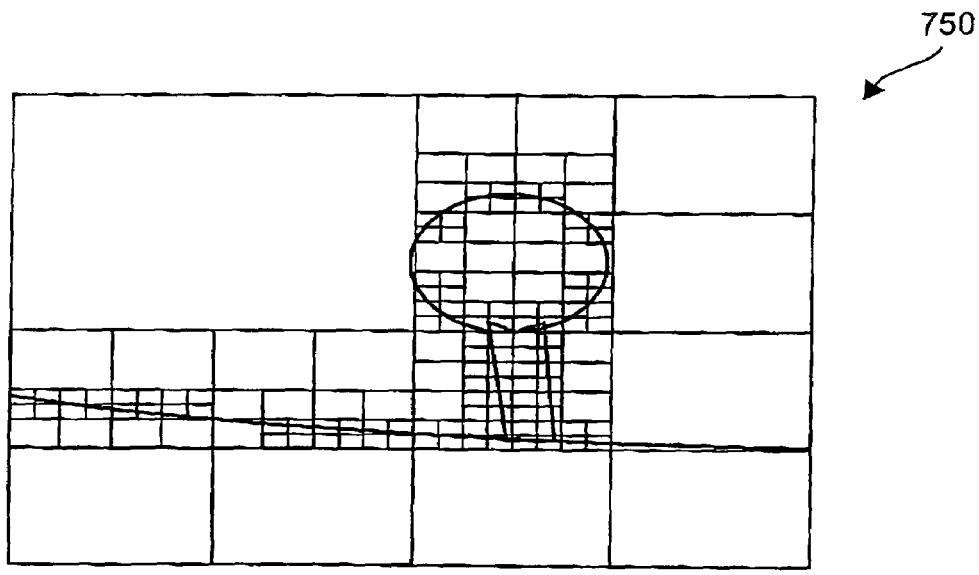
Figure 8B:
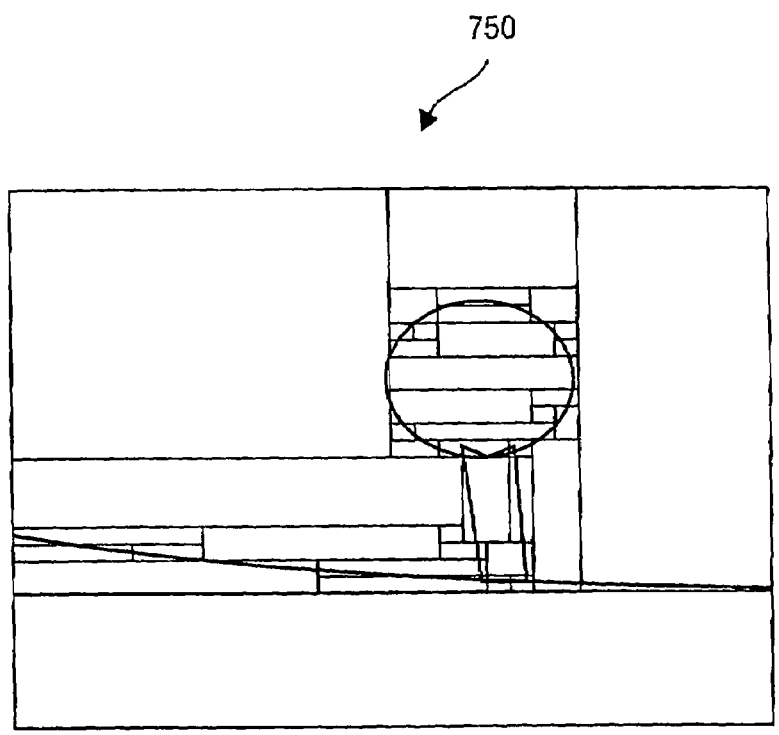
FIG. 8B illustrates an example of merging the split segmented images of FIG. 7E in accordance with the preferred merging process of FIG. 8A.

Turning now to 8B, there is shown an example of merging the split segmented images of FIG. 7E in accordance with the preferred merging process of FIG. 8A. The primary step includes merging the adjacent rectangles within each segmented region 752, 754, 756, and 758. FIG. 8B illustrates the merged adjacent regions. The output for this process is a list of the vertices of rectangles for each of the segmented regions 752, 754, 756, and 758. Thus instead of storing against each segmented region each pixel within the segmented region, the preferred process stores the vertices of a series of rectangles that make up that segmented region.

1.3 Markov Random Field (MRF) Merging Process

The preferred merging process 110 is based on a Markov Random Field model. In the preferred Markov Random Field model, $X=\{X_i, 1 \leq i \leq N\}$ denotes a set of random variables where $X_i$ is associated with region $R_i$ of the segmented image, and $\Lambda=\{\lambda_1, \lambda_2, \ldots, \lambda_m\}$ is a set of possible labels such that $X_i \in \Lambda$ for all i.

For the MRF segmenter, the labels correspond to region names ($m \leq N$). In the initial segmentation obtained from the initial segmentation 104, the image is assumed to be over-segmented. The MRF segmenter iteratively updates the region names so that similar regions get the same name and are eventually merged.

In this model $\omega=(X_1=x_1, X_2=x_2, \ldots, X_N=x_N)$ is one of all instances from the configuration space. The vector X is a Markov random field if:
1. $P(\omega)>0$, for all $\omega$;
2. $P(X_i=x_i|X_j=x_j, R_j \neq R_i)=P(X_i=x_i|X_j=x_j, R_j \in G_i)$ where $P(\bullet)$ and $P(\bullet|\bullet)$ are the joint and conditional probability density functions (pdf) respectively, and $G_i$ is the set of all the nodes in R which are neighbors of $R_i$. Intuitively, the MRF is a random field with the property that the statistic at a particular node depends only on that of its neighbors.

The pdf of the MRF has a general form, known as the Gibbs distribution:

$$P(\omega)=Z^{-1}\exp(-U(\omega)),\qquad \text{Eqn (4)}$$

where Z is a normalizing constant and $U(\omega)$ an energy function.

The function $U(\omega)$ is obtained by summing some clique functions $V_c(\omega)$:

$$U(\omega) = \sum_{c \in C} V_c(\omega), \qquad \text{Eqn (5)}$$

$V_c(\omega)$ is a clique function which depends only on the variables $X_i$ such that the region $R_i$ belongs to clique c.

The MRF segmenter is preferably based on a region process, i.e. it merges regions based on their similarity. Since there should exist a discontinuity on the common boundary between two different segmented regions, the MRF segmenter could also use a boundary process.

The clique functions are defined based on the constraint that a segmented region should be uniform in a set of features such as intensity, color, texture, etc. A list of features that can be used is shown in Table B.

In this MRF model, $F_i^k$ denotes the $k^{th}$ feature for region $R_i$ and M the number of features. Cliques which contain two regions are only considered and the clique functions are defined as:

$$V_c(\omega) = \sum_{\{R_i,R_j\} \in C} \eta_{ij} \max_{1 \leq k \leq M} |F_i^k - F_j^k|, \qquad \text{Eqn (6)}$$

where $\eta_{ij}$ is a binary variable which has the value 1 if $X_i$ and $X_j$ have the same region label, and the value 0 otherwise.

All the features are normalized using the mean and standard deviation computed for all the regions of the initial RAG, wherein the mean for each feature is zero and the STD is one. This allows the merging method to consider only the most discriminant feature for each region pair, as shown in equation (6).

TABLE B

Description of the features measured for a region.
Cov = 3 × 3 covariance matrix; $lum_x$ = normalized luminance at pixel x; $N_x$ = set of 4 neighbors of pixel x.

| Feature | Definition |
| --- | --- |
| r | Mean R/(R + G + B) |
| g | Mean G/(R + G + B) |
| b | Mean B/(R + G + B) |
| C1 | Cov[0,0] |
| C2 | Cov[0,1] |
| C3 | Cov[0,2] |
| C4 | Cov[1,0] |
| C5 | Cov[1,1] |
| C6 | Cov[1,2] |
| MLum | Mean luminance |
| SDLum | Standard deviation of luminance |
| r − b | |
| r − g | |
| saturation | [max(r, g, b) − min(r, g, b)]/max(r, g, b) |
| smoothness | $\frac{1}{\text{area}(R_i)} \sum_{x \in R_i} \sum_{y \in N_x} \frac{|lum_x - lum_y|}{4}$ |

The segmented image is merged by optimizing of the MRF model. MAP estimators aim at finding the configuration of the random field which maximizes the probability distribution eqn (4), i.e. minimizing the energy function eqn (5).

The minimization method used in the preferred merging process is a deterministic relaxation process. The binary clique which has the smallest $V_c(\omega)$, i.e. the smallest difference in features, is updated first: one of the regions takes the other region's name and both regions are merged. Then, the segmenter keeps updating the clique which has the smallest clique function until $V_c(\omega)$ is bigger than a predefined energy threshold $T_e$. Thus, regions having features which are different stay separated.

Once two regions are merged they can't be split again. After each merging, the energy needs to be updated only in the vicinity of the two regions which have just been merged.

Figure 9:
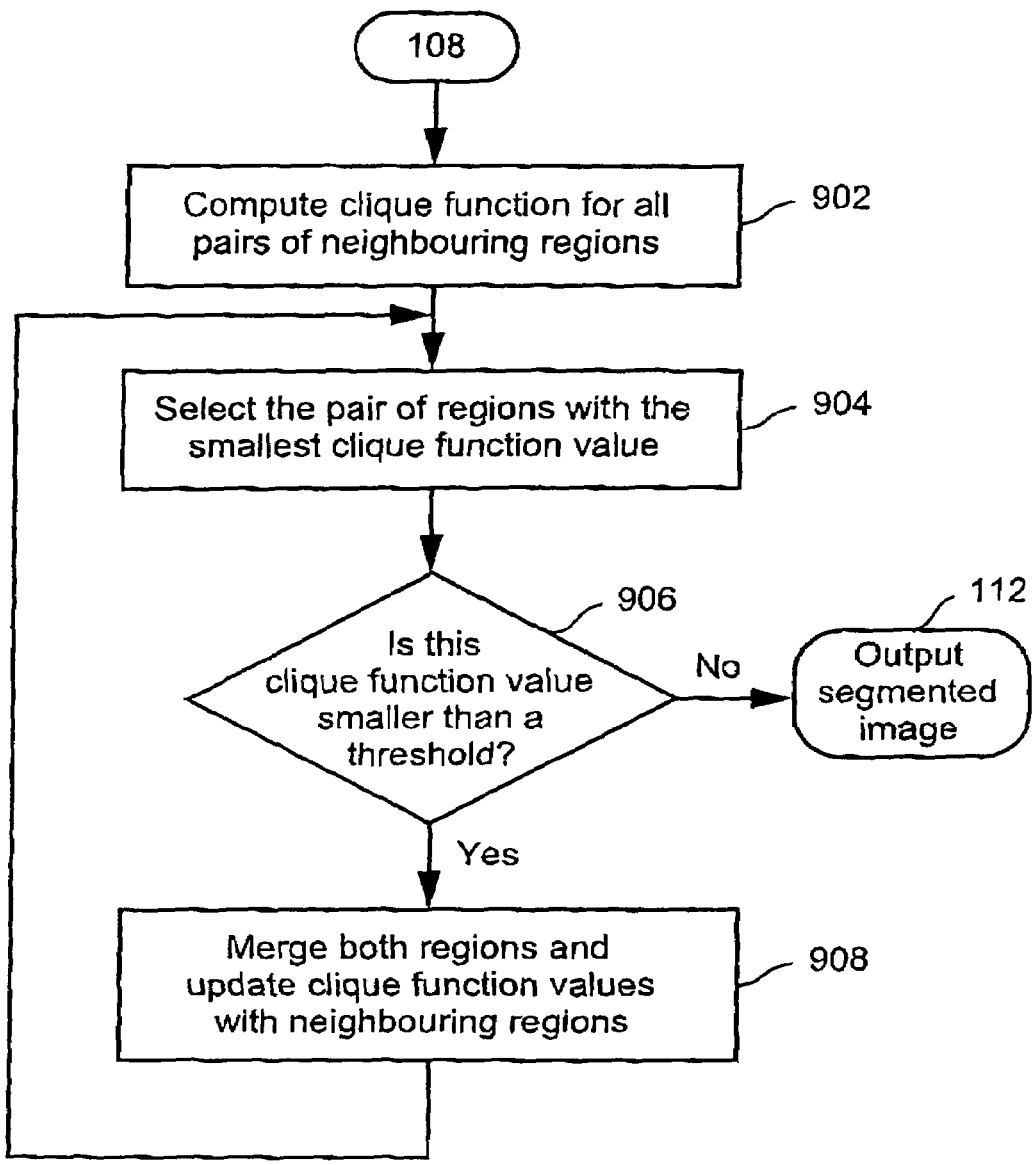
FIG. 9 is a flow chart of MRF merging the segmented image as used in FIG. 1.

FIG. 9 is a flow chart of the preferred method of merging the regions of the segmented images as used in FIG. 1. After RAGs of the segmented regions have been built by the step 108, the merging process commences. In step 902, clique functions $V_c(\omega)$ for all pairs of neighboring segmented regions. In the next step 904, the pair of segmented regions are selected which has the smallest clique function value. The processing continues at decision block 906, where a check is made whether this clique function value is less than a predetermined threshold value. If the decision block 906 returns true, then the processing continues at step 908. In step 908, both selected regions are merged and the features for merged regions are recomputed. In addition, the clique functions of the merged region with neighboring regions is updated. The merging process continues until the decision block 906 determines clique functions are greater than or equal to the predetermined threshold value. The merging process then terminates at step 112, where the final segmented image is outputted.

This merging process allows a good trade off between accuracy and speed.

Preferred Embodiment of Apparatus(s)

Figure 10:
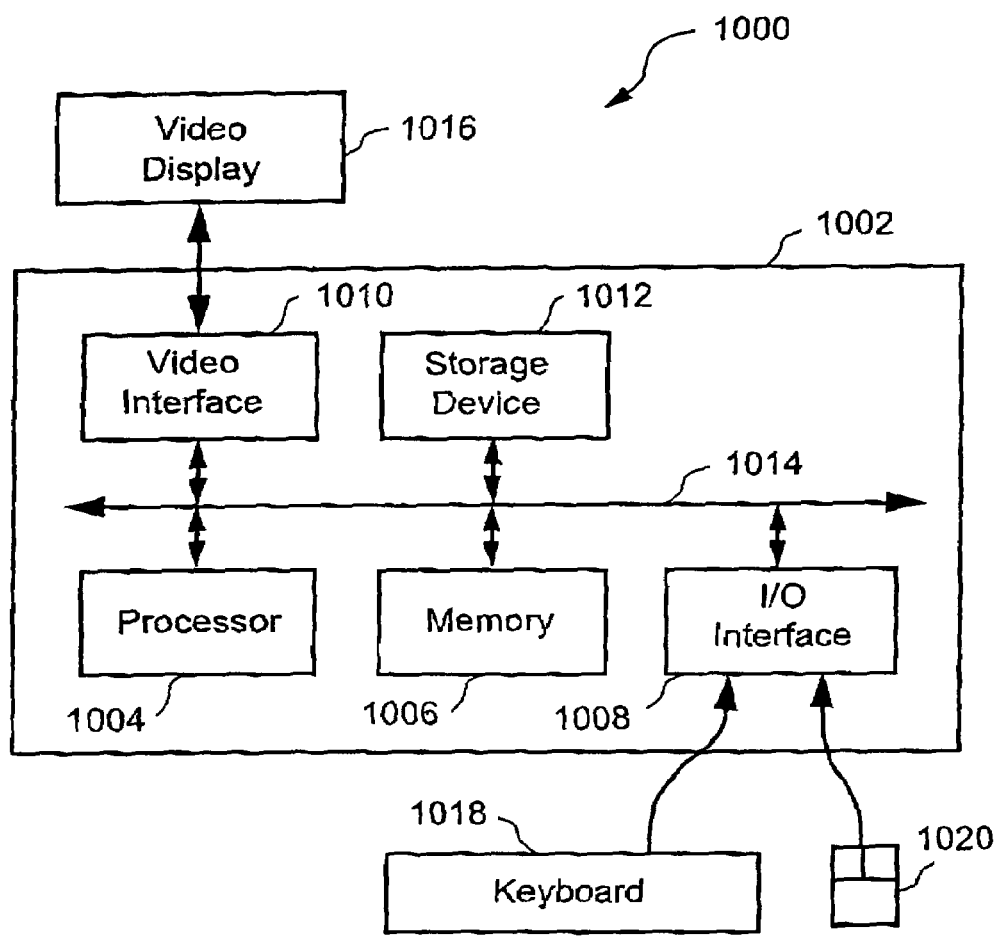
FIG. 10 is a block diagram of a general purpose computer.

The image segmentation processes are preferably practiced using a conventional general-purpose computer, such as the one shown in FIG. 10, wherein the processes of FIGS. 1 to 9 may be implemented as software executing on the computer. In particular, the steps of the image segmentation method are effected by instructions in the software that are carried out by the computer. The software may be divided into two separate parts; one part for carrying out the image segmentation methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for image segmentation in accordance with the embodiments of the invention.

The computer system 1000 consists of the computer 1002, a video display 1016, and input devices 1018, 1020. In addition, the computer system 1000 can have any of a number of other output devices including line printers, laser printers, plotters, and other reproduction devices connected to the computer 1002. The computer system 1000 can be connected to one or more other computers via a communication interface 1008c using an appropriate communication channel 1030 such as a modem communications path, a computer network, or the like. The computer network may include a local area network (LAN), a wide area network (WAN), an Intranet, and/or the Internet.

The computer 1002 itself consists of a central processing unit(s) (simply referred to as a processor hereinafter) 1004, a memory 1006 which may include random access memory (RAM) and read-only memory (ROM), input/output (IO) interfaces 1008a, 1008b & 1008c, a video interface 1010, and one or more storage devices generally represented by a block 1012 in FIG. 10. The storage device(s) 1012 can consist of one or more of the following: a floppy disc, a hard disc drive, a magneto-optical disc drive, CD-ROM, magnetic tape or any other of a number of non-volatile storage devices well known to those skilled in the art. Each of the components 1004 to 1012 is typically connected to one or more of the other devices via a bus 1014 that in turn can consist of data, address, and control buses.

The video interface 1010 is connected to the video display 1016 and provides video signals from the computer 1002 for display on the video display 1016. User input to operate the computer 1002 can be provided by one or more input devices 1008b. For example, an operator can use the keyboard 1018 and/or a pointing device such as the mouse 1020 to provide input to the computer 1002.

The system 1000 is simply provided for illustrative purposes and other configurations can be employed without departing from the scope and spirit of the invention. Exemplary computers on which the embodiment can be practiced include IBM-PC/ATs or compatibles, one of the Macintosh™ family of PCs, Sun Sparcstation™, or the like. The foregoing are merely exemplary of the types of computers with which the embodiments of the invention may be practiced. Typically, the processes of the embodiments, described hereinafter, are resident as software or a program recorded on a hard disk drive (generally depicted as block 1012 in FIG. 10) as the computer readable medium, and read and controlled using the processor 1004. Intermediate storage of the program and pixel data and any data fetched from the network may be accomplished using the semiconductor memory 1006, possibly in concert with the hard disk drive 1012.

In some instances, the program may be supplied to the user encoded on a CD-ROM or a floppy disk (both generally depicted by block 1012), or alternatively could be read by the user from the network via a modern device connected to the computer, for example. Still further, the software can also be loaded into the computer system 1000 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The methods of image segmentation may alternatively be implemented in dedicated hardware such as one or more integrated circuits performing the functions or sub functions of the image segmentation. Such dedicated hardware may include graphic processors, digital signal processors, or one or more microprocessors and associated memories.

The foregoing only describes a small number of embodiments of the present invention, however, modifications and/or changes can be made thereto without departing from the scope and spirit of the invention. The present embodiments are, therefore, to be considered in all respects to be illustrative and not restrictive.

We claim:

1. A method of segmenting an image, the image comprising a plurality of pixels, wherein said method comprises the steps of:

allocating one or more pixels as seeds;

growing regions from the seeds so as to segment the image into regions, wherein only a number of pixels that border the regions are considered, the number being smaller than a total number of pixels that border the regions, and wherein a variable step size is used to scan the bordering pixels, the step size being a function of the quantity of bordering pixels, and the considered pixel that is most similar in a property to a region bordered by the considered pixel is appended to the region to form an expanded region and the property of the expanded region is updated; and repeating said growing step until no pixels bordering the regions are available.

2. A method as claimed in claim 1, wherein the property of the pixels is luminance.

3. A method of segmenting an image into regions, the image comprising a plurality of pixels, said method comprising the steps of:

(a) allocating one or more pixels as seeds for the regions;

(b) generating a list of pixels that border the regions;

(c) scanning only a subset of pixels in the list of pixels, the number of pixels in the subset being smaller than the number of pixels in the list;

(d) determining a value, for each scanned pixel, indicative of the similarity of a property of the scanned pixel and the corresponding property of a region that the scanned pixel borders;

(e) selecting a scanned pixel that is most similar in the property to the region that borders the scanned pixel, wherein, if a current scanned pixel has a value below a minimum threshold said scanning step terminates and the current scanned pixel is selected;

(f) appending the selected pixel to the region bordered by the selected pixel;

(g) calculating an updated property of the region as a function of the property of the region prior to said appending step and the property of the appended pixel; and (h) repeating steps (b) to (g) until the image is segmented.

4. A method as claimed in claim 3, wherein a variable step size is used to scan the list of pixels, the step size being a function of the length of the list of pixels, and said selection step selects a pixel having a value which is the minimum of all the scanned pixels.

5. A method as claimed in claim 3, wherein the property is the grey-value of the pixels.

6. A method as claimed in claim 3, wherein the value is determined in accordance with the following:

$$\delta(x) = \left| g(x) - \operatorname*{mean}_{y \in A_i(x)}[g(y)] \right|,$$

where g(x) is the grey value of the image point x adjoining region $A_i(x)$ and g(y) is the grey value of the image point y within region $A_i(x)$.

7. A method as claimed in claim 3, wherein the value is determined in accordance with a metric in color space.

8. A method as claimed in claim 3, wherein said method further comprises a step of merging regions which have similarities.

9. A method as claimed in claim 8, wherein said merging step comprises the sub-steps of:

a) determining for each pair of neighboring regions a clique function value representative of the similarity of the property of the pair of neighboring regions;

b) selecting the pair of regions with the smallest clique function value;

c) merging both the selected regions to produce a merged region and updating the merged region's clique functions with neighboring regions, if the smallest clique function value is less than a predetermined threshold; and repeating the sub-steps a) to c) of said merging step until the smallest clique function value is greater than or equal to the threshold.

10. A method as claimed in claim 3, wherein the threshold is the determined value of the most recently selected pixel.

11. A method of segmenting an image, the image comprising a plurality of pixels, said method comprising the steps of:

allocating one or more pixels as seeds in the image; and growing regions of pixels from the seeds, wherein said growing step comprises the sub-steps of:

generating a list of pixels that border the regions;

scanning a number of the pixels of the list using a step size between scanned pixels that is a function of the length of the list;

determining, for each scanned pixel, a value indicative of the similarity of the luminance of the scanned pixel and the corresponding luminance of a region that the scanned pixel borders;

selecting a pixel that has a minimum value;

appending the selected pixel to the region it borders;

updating the corresponding luminance of the region that includes the appended pixel; and repeating the sub-steps of the growing step until there are no more pixels that border the regions.

12. A method as claimed in claim 11, wherein said selection step selects the first scanned pixel having a value below a minimum threshold.

13. A method as claimed in claim 12, wherein the threshold is the determined value of the most recently selected pixel.

14. A method as claimed in claim 11, wherein said selection step selects a pixel having a value which is the minimum of all the scanned pixels.

15. A method as claimed in claim 11, wherein the value is determined in accordance with the following:

$$\delta(x) = \left| g(x) - \operatorname*{mean}_{y \in A_i(x)}[g(y)] \right|,$$

where g(x) is the grey value of the image point x adjoining region $A_i(x)$ and g(y) is the grey value of the image point y within region $A_i(x)$.

16. A method as claimed in claim 11, wherein the method further comprises the step of:

merging neighboring regions to produce a merged region if their similarity is less than a predetermined threshold.

17. A method of segmenting an image, the image comprising a plurality of pixels and the method comprising the steps of:

allocating one or more pixels as seeds;

growing regions from the seeds so as to segment the image into a number of regions;

storing the segmented image in a queue; and performing the following sub-steps until the queue is empty:

removing and selecting the segmented image or a previously divided rectangular area of the segmented image currently stored first in the queue as the current rectangular area;

computing a value representative of the size of a dominant segmented region within the current area divided by the size of the current area;

storing the co-ordinates of the current area, if the value is greater than a predetermined threshold, otherwise;

dividing the current area into a plurality of rectangular areas and adding the plurality of rectangular areas to the queue;

merging the divided rectangular areas which have a common dominant region and share a common edge; and outputting the vertices of the merged rectangular areas as a representation of the segmented image.

18. A method as claimed in claim 17, wherein said performing step further comprises the sub-step of:

storing the co-ordinates of the current area, if the size of the current area is less than a predetermined size.

19. A method as claimed in claim 17, wherein the rectangular areas comprise one or more equilateral rectangular areas.

20. A method as claimed in claim 17, wherein said dividing sub-step comprises dividing the current area into four rectangular areas.

21. A method as claimed in claim 17, wherein the predetermined threshold is 0.95.

22. A method of segmenting an image, the image comprising a plurality of pixels, said method comprising the steps of:

distributing seeds in areas of the image as a function of a property of the pixels within those areas, wherein fewer seeds are allocated to those areas of the image having pixels homogeneous in the property, and wherein said distribution step comprises the sub-steps of:

(a) dividing the image into a plurality of areas;

(b) allocating for each divided area, one or more seeds as a function of the property within the divided area and the size of the divided area as compared to the size of the image; and (c) storing the locations of each allocated seed;

growing regions from the seeds so as to segment the image into regions, wherein only a number of pixels that border the regions are considered, the number being smaller than a total number of pixels that border the regions, and the considered pixel that is most similar in a property to a region bordered by the considered pixel is appended to the region to form an expanded region and the property of the expanded region is updated; and repeating said growing step until no pixels bordering the regions are available.

23. A method as claimed in claim 22, wherein said distribution step comprises the sub-steps of:

selecting the image or a previously divided area of the image as the current area;

seeding the center of the current area when the difference between the maximum and minimum values of the property of the pixels within the current area is less than a first predetermined threshold;

subdividing the current area when the size of the current area is greater than a second predetermined threshold and the difference is greater than or equal to the first predetermined threshold;

uniformly seeding the current area in a low density manner when the size of the area is less than or equal to the second predetermined threshold and the difference is greater than or equal to the first predetermined threshold and less than a third predetermined threshold;

subdividing the current area when the size of the area is greater than a fourth predetermined threshold and less than or equal to the second predetermined threshold and the difference is greater than or equal to the third predetermined threshold;

uniformly seeding the current area in a high density manner when the size of the area is less than or equal to a fourth predetermined threshold and the difference is greater than or equal to the third predetermined threshold; and repeating the sub-steps of the distribution step until all of the divided areas are seeded.

24. A method as claimed in claim 23, wherein said subdividing steps comprise subdividing the current area into four areas.

25. A method as claimed in claim 22, wherein the property of the pixels is luminance.

26. A method as claimed in claim 22, wherein said growing step comprises the sub-steps of:

generating a list of pixels that border the growing regions;

scanning a subset of pixels from the list of pixels in a predetermined manner;

determining a value, for each scanned pixel, indicative of the similarity of a property of the scanned pixel and the corresponding the property of a growing region that the scanned pixel borders;

selecting a pixel that has a minimum value;

appending the selected pixel to the region bordered by the selected pixel;

updating the corresponding property of the region that includes the appended pixel; and repeating the sub-steps of said growing step until the image is segmented.

27. A method as claimed in claim 26, wherein said scanning step terminates if a current scanned pixel has a value below a minimum threshold and said selecting step selects the current scanned pixel.

28. A method as claimed in claim 26, wherein a variable step size is used to scan the list, the step size being a function of the length of the list, and said selection step selects a pixel having a value which is the minimum of all the scanned pixels.

29. A method as claimed in claim 22, wherein the method further comprises a step of merging the regions which have similarities.

30. A method as claimed in claim 29, wherein said merging step comprises the sub-steps of:

determining for each pair of neighboring regions a clique function value representative of the similarity of the property of the pair of neighboring regions;

selecting the pair of regions with the smallest clique function value;

merging both the selected regions to produce a merged region and updating the merged region's clique functions with neighboring regions, if the smallest clique function value is less than a predetermined threshold;

repeating the sub-steps of the merging step until the smallest clique function value is greater than or equal to the threshold.

31. A method as claimed in claim 22, wherein the method further comprises the steps of:

splitting the image into a plurality of rectangular areas, wherein each rectangular area comprises a region or part thereof forming a dominant portion of the rectangular area;

merging the rectangular areas which have a common dominant portion and share a common edge; and outputting the vertices of the merged rectangular areas as a representation of the segmented image.

32. A method of segmenting an image, the image comprising a plurality of pixels, said method comprising the steps of:

(a) allocating pixels as seeds in areas of the image as a function of the luminance of the pixels within those areas, wherein fewer seeds are allocated to those areas of the image having pixels of homogeneous luminance and wherein the seeds form growing regions;

(b) generating a list of pixels that border the growing regions;

(c) scanning a number of the pixels of the list of pixels using a step size between scanned pixels that is a function of the length of the list;

(d) determining, for each scanned pixel, a value indicative of the similarity of the luminance of the scanned pixel and the corresponding luminance of a growing region that the scanned pixel borders;

(e) selecting a pixel that has a minimum value;

(f) appending the selected pixel to the growing region it borders;

(g) updating the corresponding luminance of the region that includes the appended pixel; and (h) repeating the sub-steps (b) to (g) until there are no more pixels that border the growing regions.

33. A method as claimed in claim 32, wherein the method further comprises the step of:

(i) merging neighboring regions to produce a merged region if their similarity is less than a predetermined threshold.

34. Apparatus for segmenting an image, the image comprising a plurality of pixels, wherein said apparatus comprises:

means for allocating one or more pixels as seeds;

means for growing regions from the seeds so as to segment the image into a number of regions, wherein only a number of pixels that border the regions are considered, the number being smaller than a total number of pixels that border the regions, and wherein a variable step size is used to scan the bordering pixels, the step size being a function of the quantity of bordering pixels, and the considered pixel that is most similar in a property to a region bordered by the considered pixel is appended to the region to form an expanded region and the property of the expanded region is updated; and means for controlling to effect repeated application of said means for growing regions until no pixels bordering the regions are available.

35. Apparatus for segmenting an image, the image comprising a plurality of pixels, wherein said apparatus comprises:

means for allocating one or more pixels as seeds in the image; and means for growing regions of pixels from the seeds, wherein said growing means comprises:

means for generating a list of pixels that border the regions;

means for scanning only a subset of the pixels of the list, the number of pixels in the subset being smaller that the number of pixels in the list;

means for determining, for each scanned pixel, a value indicative of the similarity of a property of the scanned pixel and the corresponding property of a region that the scanned pixel borders;

means for selecting a scanned pixel that is most similar in the property to the region that the scanned pixel borders, wherein, if a current scanned pixel has a value below a minimum threshold, said means for scanning stops scanning the subset of pixels and said means for selecting selects the current scanned pixel;

means for appending the selected pixel to the region bordered by the selected pixel;

means for calculating an updated property of the region as a function of the property of the region prior to the appending and the property of the appended pixel; and means for repeating the operations of said growing means until there are no more pixels that border the regions.

36. Apparatus for segmenting an image, the image comprising a plurality of pixels and the apparatus comprising:

means for allocating one or more pixels as seeds;

means for growing regions from the seeds so as to segment the image into a number of regions;

means for storing the segmented image in a queue;

means for removing and selecting, until the queue is empty, the segmented image or a previously divided rectangular area of the segmented image currently stored first in the queue as the current rectangular area;

means for computing a value representative of the size of the dominant segmented region within the current area divided by the size of the current area;

means for storing the co-ordinates of the current area, if the value is greater than a predetermined threshold;

means for dividing the current area into a plurality of rectangular areas of the current area and adding the plurality of rectangular areas to the queue, if the value is less than or equal to the predetermined threshold;

means for merging the divided rectangular areas which have a common dominant region and share a common edge; and means for outputting the vertices of the merged rectangular areas as a representation of the segmented image.

37. Apparatus for segmenting an image, the image comprising a plurality of pixels, wherein said apparatus comprises:

means for distributing seeds in areas of the image as a function of a property of the pixels within those areas, wherein fewer seeds are allocated to those areas of the image having pixels homogeneous in the property, and wherein said means for distributing seeds comprises:

(a) means for dividing the image into a plurality of areas:

(b) means for allocating, for each divided area, one or more seeds as a function of the property within the divided area and the size of the divided area as compared to the size of the image; and (c) means for storing the locations of each allocated seed;

means for growing regions from the seeds so as to segment the image into regions, wherein only a number of pixels that border the regions are considered, the number being smaller than a total number of pixels that border said regions, and the considered pixel that is most similar in a property to a region bordered by the considered pixel is appended to the region to form an expanded region and the property of the expanded region is updated; and means for controlling to effect repeated application of said means for growing regions until no pixels bordering the regions are available.

38. Apparatus for segmenting an image, the image comprising a plurality of pixels, wherein said apparatus comprises:

means for allocating pixels as seeds in areas of the image as a function of the luminance of the pixels within those areas, wherein fewer seeds are allocated to those areas of the image having pixels of homogeneous luminance and wherein the seeds form growing regions;

means for generating a list of pixels that border the growing regions;

means for scanning a number of the pixels of the list of pixels using a step size between scanned pixels that is a function of the length of the list;

means for determining, for each scanned pixel, a value indicative of the similarity of the luminance of the scanned pixel and the corresponding luminance of a growing region that the scanned pixel borders;

means for selecting a pixel that has a minimum the value;

means for appending the selected pixel to the growing region it borders;

means for updating the corresponding luminance of the region that includes the appended pixel; and means for repeating the operations of the allocating means, generating means, scanning means, determining means, appending means, and updating means until there are no more pixels that border the growing regions.

39. A computer program product, including a computer readable medium having recorded thereon a computer program for segmenting an image, the image comprising a plurality of pixels, wherein said computer program product comprises:

means for allocating one or more pixels as seeds;

means for growing regions from the seeds so as to segment the image into regions, wherein only a number of pixels that border the regions are considered, the number being smaller that a total number of pixels that border the regions, and wherein a variable step size is used to scan the bordering pixels, the step size being a function of the quantity of bordering pixels, and the considered pixel that is most similar in a property to a region bordered by the considered pixels is appended to the region to form an expanded region and the property of the expanded region is updated; and means for controlling to effect repeated application of said means for growing regions until no pixels bordering the regions are available.

40. A computer program product, including a computer readable medium having recorded thereon a computer program for segmenting an image, the image comprising a plurality of pixels, wherein said computer program product comprises:

means for allocating one or more pixels as seeds in the image; and means for growing regions of pixels from the seeds, wherein said growing means comprises:

means for generating a list of pixels that border the regions;

means for scanning only a subset of the pixels of the list, the number of pixels in the subset being smaller than the number of pixels in the list;

means for determining, for each scanned pixel, a value indicative of the similarity of a property of the scanned pixel and the corresponding property of a region that the scanned pixel borders;

means for selecting a scanned pixel that is most similar in the property to the region that the scanned pixel borders, wherein, if a current scanned pixel has a value below a minimum threshold, said means for scanning stops scanning the subset of pixels and said means for selecting selects the current scanned pixel;

means for appending the selected pixel to the region bordered by the selected pixel;

means for calculating an updated property of the region as a function of the property of the region prior to the appending and the property of the appended pixel; and means for repeating the operations of said growing means until there are no more pixels that border the regions.

41. A computer program product, including a computer readable medium having recorded thereon a computer program for segmenting an image, the image comprising a plurality of pixels and the computer program product comprising:

means for allocating one or more pixels as seeds;

means for growing regions from the seeds so as to segment the image into a number of regions;

means for storing the segmented image in a queue;

means for removing and selecting, until the queue is empty, the segmented image or a previously divided rectangular area of the segmented image currently stored first in the queue as the current rectangular area;

means for computing a value representative of the size of the dominant segmented region within the current area divided by the size of the current area;

means for storing the co-ordinates of the current area, if the value is greater than a predetermined threshold;

means for dividing the current area into a plurality of rectangular areas of the current area and adding the plurality of rectangular areas to the queue, if the value is less than or equal to the predetermined threshold;

means for merging the divided rectangular areas which have a common dominant region and share a common edge; and means for outputting the vertices of the merged rectangular areas as a representation of the segmented image.

42. A computer program product, including a computer readable medium having recorded thereon a computer program for segmenting an image, the image comprising a plurality of pixels, wherein said computer program product comprises:

means for distributing seeds in areas of the image as a function of a property of the pixels within those areas, wherein fewer seeds are allocated to those areas of the image having pixels homogeneous in the property, and wherein said means for distributing seeds comprises:

(a) means for dividing the image into a plurality of areas;

(b) means for allocating, for each divided area, one or more seeds as a function of the property within the divided area and the size of the divided area as compared to the size of the image; and (c) means for storing the locations of each allocated seed;

means for growing regions from the seeds so as to segment the image regions, wherein only a number of pixels that border the regions are considered, the number being smaller than a total number of pixels that border the regions, and the considered pixel that is most similar in a property to a region bordered by the considered pixel is appended to the region to form an expanded region, and the property of the expanded region is updated; and means for controlling to effect repeated application of said means for growing regions is repeatedly applied until no pixels bordering the regions are available.

43. A computer program product, including a computer readable medium having recorded thereon a computer program for segmenting an image, the image comprising a plurality of pixels, wherein said computer program product comprises:

means for allocating pixels as seeds in areas of the image as a function of the luminance of the pixels within those areas, wherein fewer seeds are allocated to those areas of the image having pixels of homogeneous luminance and wherein the seeds form growing regions;

means for generating a list of pixels that border the growing regions;

means for scanning a number of the pixels of the list of pixels using a step size between scanned pixels that is a function of the length of the list;

means for determining, for each scanned pixel, a value indicative of the similarity of the luminance of the scanned pixel and the corresponding luminance of a growing region that the scanned pixel borders;

means for selecting a pixel that has a minimum value;

means for appending the selected pixel to the growing region it borders;

means for updating the corresponding luminance of the region that includes the appended pixel; and means for repeating the operations of said allocating means, generating means, scanning means, determining means, appending means, and updating means until there are no more pixels that border the growing regions.

* * * * *

UNITED STATES PATENT AND TRADEMARK OFFICE
CERTIFICATE OF CORRECTION

PATENT NO. : 7,031,517 B1
APPLICATION NO. : 09/410737
DATED : April 18, 2006
INVENTOR(S) : Delphine Anh Dao Le et al.

It is certified that error appears in the above-identified patent and that said Letters Patent is hereby corrected as shown below:

COVER PAGE:
(75) Inventors: "Delphine Anh Dao Le, New South Wales (AU); Alison Joan Lennon, New South Wales (AU);" should read -- Delphine Anh Dao Le, Drummoyne (AU); Alison Joan Lennon, Balman (AU); --.

DRAWINGS:
Sheet 6, Figure 5A, "canditate" (two occurrences) should read -- candidate --.

COLUMN 1:
Line 28, "criteria." should read -- criterion. --;
Line 41, "Anal" should read -- Anal. --;
Line 42, "et al)" should read -- et al.) --;
Line 57, "defined" should read -- defined as --;
Lines 59 and 65, "et al" should read -- et al. --; and
Line 61, "et al," should read -- et al., --.

COLUMN 14:
Line 1, "correspond" should read -- corresponds --;
Line 12, "$\sum_{y \in A} 1(x)$" should read -- $\sum_{y \in A} i(x)$ --;
Line 16, "$A_l(x)$ should read -- $A_i(x)$ --; and
Line 24, "$A_l$," should read -- $A_i$, --.

COLUMN 16:
Line 57, "step 5636," should read -- step 536, --;
Line 59, "DYN_THRESHOLD. After" should read -- DYN_THRESHOLD, after --.

COLUMN 17:
Line 9, "simplicities" should read -- simplicity's --; and

COLUMN 27:
Line 57, "the" (first occurrence) should be deleted.

UNITED STATES PATENT AND TRADEMARK OFFICE
CERTIFICATE OF CORRECTION

| | | |
|---|---|---|
| PATENT NO. | : 7,031,517 B1 | Page 2 of 2 |
| APPLICATION NO. | : 09/410737 | |
| DATED | : April 18, 2006 | |
| INVENTOR(S) | : Delphine Anh Dao Le et al. | |

It is certified that error appears in the above-identified patent and that said Letters Patent is hereby corrected as shown below:

COLUMN 30:
Line 44, "the" should be deleted; and
Line 63, "that" (first occurrence) should read -- than --.

Signed and Sealed this

Thirtieth Day of October, 2007

JON W. DUDAS
*Director of the United States Patent and Trademark Office*